United States Patent
Fleming

(10) Patent No.: US 9,047,142 B2
(45) Date of Patent: *Jun. 2, 2015

(54) INTELLIGENT RENDERING OF INFORMATION IN A LIMITED DISPLAY ENVIRONMENT

(75) Inventor: Michael Fleming, Redwood City, CA (US)

(73) Assignee: Seven Networks, Inc., San Carlos, CA (US)

(*) Notice: Subject to any disclaimer, the term of this patent is extended or adjusted under 35 U.S.C. 154(b) by 966 days.

This patent is subject to a terminal disclaimer.

(21) Appl. No.: 12/970,452

(22) Filed: Dec. 16, 2010

(65) Prior Publication Data

US 2011/0179377 A1    Jul. 21, 2011

Related U.S. Application Data

(63) Continuation of application No. 11/227,013, filed on Sep. 14, 2005, now Pat. No. 7,877,703.

(60) Provisional application No. 60/661,757, filed on Mar. 14, 2005.

(51) Int. Cl.
  *G06F 3/048*  (2013.01)
  *G06F 9/54*   (2006.01)
  *G09G 5/14*   (2006.01)

(52) U.S. Cl.
  CPC *G06F 9/541* (2013.01); *G09G 5/14* (2013.01); *G09G 2340/145* (2013.01)

(58) Field of Classification Search
  CPC .............. G06F 3/0481; G06F 3/04817; G06F 2203/04806; G06Q 20/32; H04L 67/306; G08B 21/06

USPC .................. 715/765, 767, 788, 794, 800–801
See application file for complete search history.

(56) References Cited

U.S. PATENT DOCUMENTS 222,458 A    12/1879  Connolly et al.
447,918 A    3/1891   Strowger
(Continued)

FOREIGN PATENT DOCUMENTS

EP    0772327 A2    5/1997
EP    1278390 A1    1/2003
(Continued)

OTHER PUBLICATIONS

International Application No. PCT/US2011/044974, International Search Report, 15 pages, Jun. 1, 2012.
(Continued)

*Primary Examiner* — Weilun Lo
*Assistant Examiner* — Truc Chuong
(74) *Attorney, Agent, or Firm* — NKK Patent Law, PLLC

(57) ABSTRACT

Methods for the intelligent rendering of information in a limited display environment are provided. Display environments, especially in mobile devices, are limited with regard to physical space and technical capability. The present invention provides for the scaling of information in the display in light of those limitations. Additional methods for intelligently determining information to be or not to be displayed in the environment are further provided. Determinations of information to be displayed may be a result of a user-determination or automatic determinations made by a user device. Zooming and 'quick look' features are also provided.

11 Claims, 11 Drawing Sheets

(56) References Cited

U.S. PATENT DOCUMENTS

| | | |
|---|---|---|
| 4,200,770 A | 4/1980 | Hellman et al. |
| 4,255,796 A | 3/1981 | Gabbe et al. |
| 4,276,597 A | 6/1981 | Dissly et al. |
| 4,531,020 A | 7/1985 | Wechselberger et al. |
| 4,807,182 A | 2/1989 | Queen |
| 4,831,582 A | 5/1989 | Miller et al. |
| 4,875,159 A | 10/1989 | Cary et al. |
| 4,897,781 A | 1/1990 | Chang et al. |
| 4,972,457 A | 11/1990 | O'Sullivan |
| 5,008,853 A | 4/1991 | Bly et al. |
| 5,159,624 A | 10/1992 | Makita |
| 5,220,657 A | 6/1993 | Bly et al. |
| 5,263,157 A | 11/1993 | Janis |
| 5,283,856 A | 2/1994 | Gross et al. |
| 5,357,431 A | 10/1994 | Nakada et al. |
| 5,384,892 A | 1/1995 | Strong |
| 5,386,564 A | 1/1995 | Shearer et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,491,703 A | 2/1996 | Barnaby et al. |
| 5,493,692 A | 2/1996 | Theimer et al. |
| 5,519,606 A | 5/1996 | Frid-Nielsen et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostresti et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,087 A | 11/1998 | Herz et al. |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,940,813 A | 8/1999 | Hutchings |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |

(56) References Cited

U.S. PATENT DOCUMENTS

| | | |
|---|---|---|
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,274 A | 12/1999 | Hawkins et al. |
| 6,016,478 A | 1/2000 | Zhang et al. |
| 6,016,520 A | 1/2000 | Facq et al. |
| 6,018,762 A | 1/2000 | Brunson et al. |
| 6,023,700 A | 2/2000 | Owens et al. |
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,044,372 A | 3/2000 | Rothfus et al. |
| 6,044,381 A | 3/2000 | Boothby et al. |
| 6,047,051 A | 4/2000 | Ginzboorg et al. |
| 6,047,327 A | 4/2000 | Tso et al. |
| 6,052,563 A | 4/2000 | Macko |
| 6,052,735 A | 4/2000 | Ulrich et al. |
| 6,057,855 A | 5/2000 | Barkans |
| 6,065,055 A | 5/2000 | Hughes et al. |
| 6,073,138 A | 6/2000 | de l'Etraz et al. |
| 6,073,142 A | 6/2000 | Geiger et al. |
| 6,073,165 A | 6/2000 | Narasimhan et al. |
| 6,085,166 A | 7/2000 | Beckhardt et al. |
| 6,085,192 A | 7/2000 | Mendez et al. |
| 6,088,677 A | 7/2000 | Spurgeon |
| 6,101,320 A | 8/2000 | Schuetze et al. |
| 6,101,480 A | 8/2000 | Conmy et al. |
| 6,101,531 A | 8/2000 | Eggleston et al. |
| 6,112,181 A | 8/2000 | Shear et al. |
| 6,119,014 A | 9/2000 | Alperovich et al. |
| 6,119,171 A | 9/2000 | Alkhatib |
| 6,125,369 A | 9/2000 | Wu et al. |
| 6,125,388 A | 9/2000 | Reisman |
| 6,128,627 A | 10/2000 | Mattis et al. |
| 6,130,898 A | 10/2000 | Kostreski et al. |
| 6,131,096 A | 10/2000 | Ng et al. |
| 6,131,116 A | 10/2000 | Riggins et al. |
| 6,134,432 A | 10/2000 | Holmes et al. |
| 6,138,013 A | 10/2000 | Blanchard et al. |
| 6,138,124 A | 10/2000 | Beckhardt |
| 6,138,128 A | 10/2000 | Perkowitz et al. |
| 6,138,146 A | 10/2000 | Moon et al. |
| 6,141,664 A | 10/2000 | Boothby |
| 6,151,606 A | 11/2000 | Mendez |
| 6,157,630 A | 12/2000 | Adler et al. |
| 6,161,140 A | 12/2000 | Moriya |
| 6,167,379 A | 12/2000 | Dean et al. |
| 6,167,435 A | 12/2000 | Druckenmiller et al. |
| 6,170,014 B1 | 1/2001 | Darago et al. |
| 6,173,312 B1 | 1/2001 | Atarashi et al. |
| 6,173,446 B1 | 1/2001 | Khan et al. |
| 6,175,831 B1 | 1/2001 | Weinreich et al. |
| 6,178,419 B1 | 1/2001 | Legh-Smith et al. |
| 6,181,935 B1 | 1/2001 | Gossman et al. |
| 6,195,533 B1 | 2/2001 | Tkatch et al. |
| 6,198,696 B1 | 3/2001 | Korpi et al. |
| 6,198,922 B1 | 3/2001 | Baynham |
| 6,201,469 B1 | 3/2001 | Balch et al. |
| 6,202,085 B1 | 3/2001 | Benson et al. |
| 6,205,448 B1 | 3/2001 | Kruglikov et al. |
| 6,212,529 B1 | 4/2001 | Boothby et al. |
| 6,219,694 B1 | 4/2001 | Lazaridis et al. |
| 6,221,877 B1 | 4/2001 | Aronov et al. |
| 6,223,187 B1 | 4/2001 | Boothby et al. |
| 6,226,686 B1 | 5/2001 | Rothschild et al. |
| 6,233,341 B1 | 5/2001 | Riggins |
| 6,243,705 B1 | 6/2001 | Kucala |
| 6,246,875 B1 | 6/2001 | Seazholtz et al. |
| 6,247,135 B1 | 6/2001 | Feague |
| 6,249,808 B1 | 6/2001 | Seshadri |
| 6,256,666 B1 | 7/2001 | Singhal |
| 6,263,201 B1 | 7/2001 | Hashimoto et al. |
| 6,263,340 B1 | 7/2001 | Green |
| 6,269,369 B1 | 7/2001 | Robertson |
| 6,272,545 B1 | 8/2001 | Flanagin et al. |
| 6,275,850 B1 | 8/2001 | Beyda et al. |
| 6,275,858 B1 | 8/2001 | Bates et al. |
| 6,289,212 B1 | 9/2001 | Stein et al. |
| 6,289,214 B1 | 9/2001 | Backstrom |
| 6,292,904 B1 | 9/2001 | Broomhall et al. |
| 6,295,541 B1 | 9/2001 | Bodnar et al. |
| 6,300,947 B1 * | 10/2001 | Kanevsky ..................... 715/804 |
| 6,304,881 B1 | 10/2001 | Halim et al. |
| 6,308,201 B1 | 10/2001 | Pivowar et al. |
| 6,317,594 B1 | 11/2001 | Gossman et al. |
| 6,320,943 B1 | 11/2001 | Borland |
| 6,324,541 B1 | 11/2001 | de l'Etraz et al. |
| 6,324,542 B1 | 11/2001 | Wright, Jr. et al. |
| 6,324,544 B1 | 11/2001 | Alam et al. |
| 6,324,587 B1 | 11/2001 | Trenbeath et al. |
| 6,327,586 B1 | 12/2001 | Kisiel |
| 6,336,117 B1 | 1/2002 | Massarani |
| 6,351,767 B1 | 2/2002 | Batchelder et al. |
| 6,356,937 B1 | 3/2002 | Montville et al. |
| 6,363,051 B1 | 3/2002 | Eslambolchi et al. |
| 6,363,352 B1 | 3/2002 | Dailey et al. |
| 6,370,566 B2 | 4/2002 | Discolo et al. |
| 6,377,810 B1 | 4/2002 | Geiger et al. |
| 6,380,959 B1 | 4/2002 | Wang et al. |
| 6,389,422 B1 | 5/2002 | Doi et al. |
| 6,389,455 B1 | 5/2002 | Fuisz |
| 6,389,457 B2 | 5/2002 | Lazaridis et al. |
| 6,397,057 B1 | 5/2002 | Malackowski et al. |
| 6,397,230 B1 | 5/2002 | Carmel et al. |
| 6,401,104 B1 | 6/2002 | LaRue et al. |
| 6,401,112 B1 | 6/2002 | Boyer et al. |
| 6,401,113 B2 | 6/2002 | Lazaridis et al. |
| 6,405,197 B2 | 6/2002 | Gilmour |
| 6,411,696 B1 | 6/2002 | Iverson et al. |
| 6,415,031 B1 | 7/2002 | Colligan et al. |
| 6,418,308 B1 | 7/2002 | Heinonen et al. |
| 6,421,669 B1 | 7/2002 | Gilmour et al. |
| 6,421,781 B1 | 7/2002 | Fox et al. |
| 6,430,602 B1 | 8/2002 | Kay et al. |
| 6,438,585 B2 | 8/2002 | Mousseau et al. |
| 6,438,612 B1 | 8/2002 | Ylonen et al. |
| 6,442,589 B1 | 8/2002 | Takahashi et al. |
| 6,442,637 B1 | 8/2002 | Hawkins et al. |
| 6,446,118 B1 | 9/2002 | Gottlieb |
| 6,463,463 B1 | 10/2002 | Godfrey et al. |
| 6,463,464 B1 | 10/2002 | Lazaridis et al. |
| 6,487,557 B1 | 11/2002 | Nagatomo |
| 6,487,560 B1 | 11/2002 | LaRue et al. |
| 6,490,353 B1 | 12/2002 | Tan |
| 6,496,802 B1 | 12/2002 | van Zoest et al. |
| 6,499,054 B1 | 12/2002 | Hesselink et al. |
| 6,505,214 B1 | 1/2003 | Sherman et al. |
| 6,516,327 B1 | 2/2003 | Zondervan et al. |
| 6,526,433 B1 | 2/2003 | Chang et al. |
| 6,526,506 B1 | 2/2003 | Lewis |
| 6,529,908 B1 | 3/2003 | Piett et al. |
| 6,532,446 B1 | 3/2003 | King |
| 6,535,892 B1 | 3/2003 | LaRue et al. |
| 6,546,005 B1 | 4/2003 | Berkley et al. |
| 6,549,939 B1 | 4/2003 | Ford et al. |
| 6,556,217 B1 | 4/2003 | Mäkipää et al. |
| 6,593,944 B1 | 7/2003 | Nicolas et al. |
| 6,601,026 B2 | 7/2003 | Appelt et al. |
| 6,615,253 B1 | 9/2003 | Bowman-Amuah |
| 6,618,710 B1 | 9/2003 | Zondervan et al. |
| 6,621,892 B1 | 9/2003 | Banister et al. |
| 6,625,621 B2 | 9/2003 | Tan et al. |
| 6,636,482 B2 | 10/2003 | Cloonan et al. |
| 6,639,693 B1 | 10/2003 | Ejiri et al. |
| 6,640,097 B2 | 10/2003 | Corrigan et al. |
| 6,640,244 B1 | 10/2003 | Bowman-Amuah |
| 6,640,249 B1 | 10/2003 | Bowman-Amuah |
| 6,643,650 B1 | 11/2003 | Slaughter et al. |
| 6,643,688 B1 | 11/2003 | Fuisz |
| 6,647,384 B2 | 11/2003 | Gilmour |

(56) References Cited

U.S. PATENT DOCUMENTS

| | | |
|---|---|---|
| 6,650,890 B1 | 11/2003 | Irlam et al. |
| 6,662,016 B1 | 12/2003 | Buckham et al. |
| 6,668,046 B1 | 12/2003 | Albal |
| 6,671,695 B2 | 12/2003 | McFadden |
| 6,671,700 B1 | 12/2003 | Creemer et al. |
| 6,671,702 B2 | 12/2003 | Kruglikov et al. |
| 6,671,757 B1 | 12/2003 | Cash et al. |
| 6,694,336 B1 | 2/2004 | Multer et al. |
| 6,697,807 B2 | 2/2004 | McGeachie |
| 6,701,378 B1 | 3/2004 | Gilhuly et al. |
| 6,707,801 B2 | 3/2004 | Hsu |
| 6,708,221 B1 | 3/2004 | Mendez et al. |
| 6,714,965 B2 | 3/2004 | Kakuta et al. |
| 6,721,787 B1 | 4/2004 | Hiscock |
| 6,727,917 B1 | 4/2004 | Chew et al. |
| 6,728,530 B1 | 4/2004 | Heinonen et al. |
| 6,728,786 B2 | 4/2004 | Hawkins et al. |
| 6,732,101 B1 | 5/2004 | Cook |
| 6,732,158 B1 | 5/2004 | Hesselink et al. |
| 6,735,591 B2 | 5/2004 | Khan |
| 6,741,232 B1 | 5/2004 | Siedlikowski et al. |
| 6,741,855 B1 | 5/2004 | Martin et al. |
| 6,742,015 B1 | 5/2004 | Bowman-Amuah |
| 6,745,024 B1 | 6/2004 | DeJaco et al. |
| 6,745,326 B1 | 6/2004 | Wary |
| 6,756,882 B2 | 6/2004 | Benes et al. |
| 6,757,362 B1 | 6/2004 | Cooper et al. |
| 6,757,696 B2 | 6/2004 | Multer et al. |
| 6,760,916 B2 | 7/2004 | Holtz et al. |
| 6,771,294 B1 | 8/2004 | Pulli et al. |
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,799,190 B1 | 9/2004 | Boothby |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,829,487 B2 | 12/2004 | Eiden et al. |
| 6,834,195 B2 | 12/2004 | Brandenberg et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,871,236 B2 | 3/2005 | Fishman et al. |
| 6,873,688 B1 | 3/2005 | Aarnio |
| 6,874,017 B1 | 3/2005 | Inoue et al. |
| 6,879,985 B2 | 4/2005 | Deguchi et al. |
| 6,886,030 B1 | 4/2005 | Easterbrook et al. |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,922,547 B2 | 7/2005 | O'Neill et al. |
| 6,922,721 B1 | 7/2005 | Minborg et al. |
| 6,925,477 B1 | 8/2005 | Champagne et al. |
| 6,931,529 B2 | 8/2005 | Kunzinger |
| 6,938,079 B1 | 8/2005 | Anderson et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,957,397 B1 | 10/2005 | Hawkins et al. |
| 6,965,917 B1 | 11/2005 | Aloni et al. |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,041 B2 | 12/2005 | Araujo et al. |
| 6,981,047 B2 | 12/2005 | Hanson et al. |
| 6,985,933 B1 | 1/2006 | Singhal et al. |
| 6,985,983 B2 | 1/2006 | Pellegrino et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link, II et al. |
| 6,993,327 B2 | 1/2006 | Mathis |
| 6,999,753 B2 | 2/2006 | Beckmann et al. |
| 7,020,685 B1 | 3/2006 | Chen et al. |
| 7,024,491 B1 | 4/2006 | Hanmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 | 6/2006 | Kreckel et al. |
| 7,069,308 B2 | 6/2006 | Abrams |
| 7,072,678 B2 | 7/2006 | Allison |
| 7,079,499 B1 | 7/2006 | Akhtar et al. |
| 7,080,371 B1 | 7/2006 | Arnaiz et al. |
| 7,082,316 B2 | 7/2006 | Eiden et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,120,692 B2 | 10/2006 | Hesselink et al. |
| 7,120,928 B2 | 10/2006 | Sheth et al. |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,181,228 B2 | 2/2007 | Boesch |
| 7,184,790 B2 | 2/2007 | Dorenbosch et al. |
| 7,185,362 B2 | 2/2007 | Hawkes et al. |
| 7,194,273 B2 | 3/2007 | Vaudreuil |
| 7,200,390 B1 | 4/2007 | Henager et al. |
| 7,203,733 B1 | 4/2007 | Bern |
| 7,206,806 B2 | 4/2007 | Pineau |
| 7,209,757 B2 | 4/2007 | Naghian et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B1 | 7/2007 | Lewis |
| 7,242,680 B2 | 7/2007 | Gallant |
| 7,245,926 B2 | 7/2007 | Liao et al. |
| 7,257,391 B2 | 8/2007 | Burgess et al. |
| 7,257,639 B1 | 8/2007 | Li et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,260,651 B2 | 8/2007 | Parrella, Sr. et al. |
| 7,272,830 B2 | 9/2007 | de Jong |
| 7,277,408 B2 | 10/2007 | Sorsa |
| 7,289,792 B1 | 10/2007 | Turunen |
| 7,289,964 B1 | 10/2007 | Bowman-Amuah |
| 7,289,971 B1 | 10/2007 | O'Neil et al. |
| 7,293,107 B1 | 11/2007 | Hanson et al. |
| 7,295,853 B2 | 11/2007 | Jin et al. |
| 7,305,252 B2 | 12/2007 | Britt et al. |
| 7,305,700 B2 | 12/2007 | Boynton et al. |
| 7,310,350 B2 | 12/2007 | Shao et al. |
| 7,310,729 B2 | 12/2007 | Gordon et al. |
| 7,349,871 B2 | 3/2008 | Labrou et al. |
| 7,359,720 B2 | 4/2008 | Hartmaier et al. |
| 7,373,386 B2 | 5/2008 | Gardner et al. |
| 7,374,099 B2 | 5/2008 | de Jong |
| 7,376,701 B2 | 5/2008 | Bhargava et al. |
| 7,382,879 B1 | 6/2008 | Miller |

(56) References Cited

U.S. PATENT DOCUMENTS

| | | |
|---|---|---|
| 7,388,950 B2 | 6/2008 | Elsey et al. |
| 7,389,412 B2 | 6/2008 | Sharma et al. |
| 7,392,483 B2 | 6/2008 | Wong et al. |
| 7,395,329 B1 | 7/2008 | Holt et al. |
| 7,398,271 B1 | 7/2008 | Borkovsky et al. |
| 7,430,609 B2 | 9/2008 | Brown et al. |
| 7,441,271 B2 | 10/2008 | Fiatal et al. |
| 7,461,071 B2 | 12/2008 | Fitzpatrick et al. |
| 7,465,231 B2 | 12/2008 | Lewin et al. |
| 7,469,125 B2 | 12/2008 | Nurmi |
| 7,483,036 B2 | 1/2009 | Moore |
| 7,499,537 B2 | 3/2009 | Elsey et al. |
| 7,502,615 B2 | 3/2009 | Wilhoite et al. |
| 7,519,042 B2 | 4/2009 | Gorday et al. |
| 7,532,571 B1 | 5/2009 | Price et al. |
| 7,539,665 B2 | 5/2009 | Mendez |
| 7,548,947 B2 | 6/2009 | Karsriel et al. |
| 7,548,969 B2 | 6/2009 | Tripp et al. |
| 7,551,900 B2 | 6/2009 | Kang et al. |
| 7,567,575 B2 | 7/2009 | Chen et al. |
| 7,574,208 B2 | 8/2009 | Hanson et al. |
| 7,575,171 B2 | 8/2009 | Lev |
| 7,584,294 B2 | 9/2009 | Plamondon |
| 7,587,482 B2 | 9/2009 | Henderson et al. |
| 7,587,608 B2 | 9/2009 | Haller et al. |
| 7,593,714 B2 | 9/2009 | Schultz et al. |
| 7,596,608 B2 | 9/2009 | Alexander et al. |
| 7,613,792 B2 | 11/2009 | Zervas et al. |
| 7,634,558 B1 | 12/2009 | Mangal et al. |
| 7,643,818 B2 | 1/2010 | Backholm et al. |
| 7,644,166 B2 | 1/2010 | Appelman et al. |
| 7,672,291 B2 | 3/2010 | Wang |
| 7,672,439 B2 | 3/2010 | Appelman et al. |
| 7,680,281 B2 | 3/2010 | Fiatal et al. |
| 7,689,664 B2 | 3/2010 | Karlberg |
| 7,693,944 B2 | 4/2010 | Appelman et al. |
| 7,694,008 B2 | 4/2010 | Chang et al. |
| 7,706,781 B2 | 4/2010 | Backholm et al. |
| 7,752,633 B1 | 7/2010 | Fleming |
| 7,757,956 B2 | 7/2010 | Koenck et al. |
| 7,769,395 B2 | 8/2010 | Fiatal et al. |
| 7,769,400 B2 | 8/2010 | Backholm et al. |
| 7,769,805 B1 | 8/2010 | Barnes et al. |
| 7,778,792 B2 | 8/2010 | Huang et al. |
| 7,783,757 B2 | 8/2010 | Plamondon |
| 7,796,742 B1 | 9/2010 | Sutaria et al. |
| 7,797,064 B2 | 9/2010 | Loomis et al. |
| 7,809,818 B2 | 10/2010 | Plamondon |
| 7,827,055 B1 | 11/2010 | Snodgrass et al. |
| 7,827,597 B2 | 11/2010 | Boynton et al. |
| 7,853,563 B2 | 12/2010 | Alvarado et al. |
| 7,877,703 B1 | 1/2011 | Fleming |
| 7,881,745 B1 | 2/2011 | Rao et al. |
| 7,899,996 B1 | 3/2011 | Levin-Michael |
| 7,917,505 B2 | 3/2011 | van Gent et al. |
| 7,921,167 B2 | 4/2011 | Shroff et al. |
| 7,933,929 B1 | 4/2011 | Mcclendon et al. |
| 7,937,091 B2 | 5/2011 | Roman et al. |
| 7,970,860 B2 | 6/2011 | Kline et al. |
| 7,996,487 B2 | 8/2011 | Snyder |
| 8,005,891 B2 | 8/2011 | Knowles et al. |
| 8,010,082 B2 | 8/2011 | Sutaria et al. |
| 8,032,409 B1 | 10/2011 | Mikurak |
| 8,064,583 B1 | 11/2011 | Sutaria et al. |
| 8,069,166 B2 | 11/2011 | Alvarado et al. |
| 8,078,158 B2 | 12/2011 | Backholm |
| 8,107,921 B2 | 1/2012 | Fiatal |
| 8,116,214 B2 | 2/2012 | Backholm et al. |
| 8,127,342 B2 | 2/2012 | Boynton et al. |
| 8,166,164 B1 | 4/2012 | Luna et al. |
| 8,190,701 B2 | 5/2012 | Luna et al. |
| 8,204,953 B2 | 6/2012 | Luna et al. |
| 8,209,709 B2 | 6/2012 | Fleming |
| 2001/0009025 A1 | 7/2001 | Ahonen |
| 2001/0010046 A1 | 7/2001 | Muyres et al. |
| 2001/0013069 A1 | 8/2001 | Shah |
| 2001/0023414 A1 | 9/2001 | Kumar et al. |
| 2001/0032254 A1 | 10/2001 | Hawkins |
| 2001/0034225 A1 | 10/2001 | Gupte et al. |
| 2001/0034244 A1 | 10/2001 | Calder et al. |
| 2001/0037453 A1 | 11/2001 | Mitty et al. |
| 2001/0039191 A1 | 11/2001 | Maierhofer |
| 2001/0041566 A1 | 11/2001 | Xanthos et al. |
| 2001/0042009 A1 | 11/2001 | Montague |
| 2001/0042099 A1 | 11/2001 | Peng |
| 2001/0043148 A1 | 11/2001 | Stewart |
| 2001/0052052 A1 | 12/2001 | Peng |
| 2001/0053687 A1 | 12/2001 | Sivula |
| 2002/0002478 A1 | 1/2002 | Swart et al. |
| 2002/0002591 A1 | 1/2002 | Ketola |
| 2002/0007303 A1 | 1/2002 | Brookler et al. |
| 2002/0013727 A1 | 1/2002 | Lee |
| 2002/0019225 A1 | 2/2002 | Miyashita |
| 2002/0019812 A1 | 2/2002 | Board et al. |
| 2002/0035556 A1 | 3/2002 | Shah et al. |
| 2002/0035617 A1 | 3/2002 | Lynch et al. |
| 2002/0038253 A1 | 3/2002 | Seaman et al. |
| 2002/0042875 A1 | 4/2002 | Shukla |
| 2002/0049828 A1 | 4/2002 | Pekarek-Kostka |
| 2002/0053078 A1 | 5/2002 | Holtz et al. |
| 2002/0055351 A1 | 5/2002 | Elsey et al. |
| 2002/0059201 A1 | 5/2002 | Work |
| 2002/0059457 A1 | 5/2002 | Ballard et al. |
| 2002/0068559 A1 | 6/2002 | Sharma et al. |
| 2002/0073207 A1 | 6/2002 | Widger et al. |
| 2002/0077077 A1 | 6/2002 | Rezvani et al. |
| 2002/0077084 A1 | 6/2002 | Zellner et al. |
| 2002/0078384 A1 | 6/2002 | Hippelainen |
| 2002/0087549 A1 | 7/2002 | Mostafa |
| 2002/0087679 A1 | 7/2002 | Pulley et al. |
| 2002/0089542 A1 | 7/2002 | Imamura |
| 2002/0091921 A1 | 7/2002 | Kunzinger |
| 2002/0095319 A1 | 7/2002 | Swart et al. |
| 2002/0095328 A1 | 7/2002 | Swart et al. |
| 2002/0095391 A1 | 7/2002 | Swart et al. |
| 2002/0095399 A1 | 7/2002 | Devine et al. |
| 2002/0098855 A1 | 7/2002 | Hartmaier et al. |
| 2002/0099613 A1 | 7/2002 | Swart et al. |
| 2002/0099809 A1 | 7/2002 | Lee |
| 2002/0101975 A1 | 8/2002 | Tiburtius et al. |
| 2002/0107944 A1 | 8/2002 | Bai et al. |
| 2002/0107985 A1 | 8/2002 | Hwang et al. |
| 2002/0116499 A1 | 8/2002 | Ennus et al. |
| 2002/0116501 A1 | 8/2002 | Ho et al. |
| 2002/0120388 A1 | 8/2002 | Bullock |
| 2002/0120766 A1 | 8/2002 | Okajima et al. |
| 2002/0120779 A1 | 8/2002 | Teeple et al. |
| 2002/0126701 A1 | 9/2002 | Requena |
| 2002/0133504 A1 | 9/2002 | Vlahos et al. |
| 2002/0144109 A1 | 10/2002 | Benantar et al. |
| 2002/0146129 A1 | 10/2002 | Kaplan |
| 2002/0152379 A1 | 10/2002 | Gefwert et al. |
| 2002/0155848 A1 | 10/2002 | Suryanarayana |
| 2002/0156839 A1 | 10/2002 | Peterson et al. |
| 2002/0158908 A1 | 10/2002 | Vaajala et al. |
| 2002/0161587 A1 | 10/2002 | Pitts, III et al. |
| 2002/0161925 A1 | 10/2002 | Munger et al. |
| 2002/0161928 A1 | 10/2002 | Ndili |
| 2002/0164977 A1 | 11/2002 | Link, II et al. |
| 2002/0167484 A1 | 11/2002 | Hatanaka et al. |
| 2002/0174189 A1 | 11/2002 | Peng |
| 2002/0186848 A1 | 12/2002 | Shaik |
| 2002/0188940 A1 | 12/2002 | Breckner et al. |
| 2002/0193094 A1 | 12/2002 | Lawless et al. |
| 2002/0194209 A1 | 12/2002 | Bolosky et al. |
| 2002/0198027 A1 | 12/2002 | Rydbeck |
| 2003/0005151 A1 | 1/2003 | Ullman et al. |
| 2003/0022662 A1 | 1/2003 | Mittal |
| 2003/0023692 A1 | 1/2003 | Moroo |
| 2003/0023975 A1 | 1/2003 | Schrader et al. |
| 2003/0028430 A1 | 2/2003 | Zimmerman |
| 2003/0028441 A1 | 2/2003 | Barsness et al. |
| 2003/0046433 A1 | 3/2003 | Luzzatti et al. |
| 2003/0046587 A1 | 3/2003 | Bheemarasetti et al. |

(56) References Cited

U.S. PATENT DOCUMENTS

| | | |
|---|---|---|
| 2003/0050041 A1 | 3/2003 | Wu |
| 2003/0054810 A1 | 3/2003 | Chen et al. |
| 2003/0056096 A1 | 3/2003 | Albert et al. |
| 2003/0060188 A1 | 3/2003 | Gidron et al. |
| 2003/0063120 A1 | 4/2003 | Wong et al. |
| 2003/0065738 A1 | 4/2003 | Yang et al. |
| 2003/0065739 A1 | 4/2003 | Shnier |
| 2003/0065802 A1 | 4/2003 | Vitikainen et al. |
| 2003/0070061 A1 | 4/2003 | Wong et al. |
| 2003/0072451 A1 | 4/2003 | Pimentel et al. |
| 2003/0078880 A1 | 4/2003 | Alley et al. |
| 2003/0084165 A1 | 5/2003 | Kjellberg et al. |
| 2003/0088629 A1 | 5/2003 | Berkowitz et al. |
| 2003/0093691 A1 | 5/2003 | Simon et al. |
| 2003/0097381 A1 | 5/2003 | Detweiler et al. |
| 2003/0100321 A1 | 5/2003 | Rao et al. |
| 2003/0100326 A1 | 5/2003 | Grube et al. |
| 2003/0117432 A1 | 6/2003 | Kautto-Kiovula et al. |
| 2003/0120685 A1 | 6/2003 | Duncombe et al. |
| 2003/0125023 A1 | 7/2003 | Fishler |
| 2003/0126216 A1 | 7/2003 | Avila et al. |
| 2003/0130984 A1 | 7/2003 | Quinlan et al. |
| 2003/0145038 A1 | 7/2003 | Bin Tariq et al. |
| 2003/0146934 A1 | 8/2003 | Bailey et al. |
| 2003/0153338 A1 | 8/2003 | Herz et al. |
| 2003/0154212 A1 | 8/2003 | Schirmer et al. |
| 2003/0156146 A1 | 8/2003 | Suomela et al. |
| 2003/0157947 A1 | 8/2003 | Fiatal et al. |
| 2003/0169262 A1 | 9/2003 | Lavelle et al. |
| 2003/0177281 A1 | 9/2003 | McQuillan et al. |
| 2003/0182431 A1 | 9/2003 | Sturniolo et al. |
| 2003/0187984 A1 | 10/2003 | Banavar et al. |
| 2003/0204605 A1 | 10/2003 | Hudson et al. |
| 2003/0208529 A1 | 11/2003 | Pendyala et al. |
| 2003/0208559 A1 | 11/2003 | Velline et al. |
| 2003/0210666 A1 | 11/2003 | Trossen et al. |
| 2003/0211845 A1 | 11/2003 | Lohtia et al. |
| 2003/0217098 A1 | 11/2003 | Bobde et al. |
| 2003/0217142 A1 | 11/2003 | Bobde et al. |
| 2003/0223554 A1 | 12/2003 | Zhang |
| 2003/0227745 A1 | 12/2003 | Khoo |
| 2003/0235308 A1 | 12/2003 | Boynton et al. |
| 2003/0236981 A1 | 12/2003 | Marmigere et al. |
| 2004/0002324 A1 | 1/2004 | Juntunen et al. |
| 2004/0006630 A1 | 1/2004 | Friend et al. |
| 2004/0015504 A1 | 1/2004 | Ahad et al. |
| 2004/0024795 A1 | 2/2004 | Hind et al. |
| 2004/0024892 A1 | 2/2004 | Creswell et al. |
| 2004/0027326 A1 | 2/2004 | Hays et al. |
| 2004/0027375 A1 | 2/2004 | Ellis et al. |
| 2004/0027378 A1 | 2/2004 | Hays et al. |
| 2004/0043770 A1 | 3/2004 | Amit et al. |
| 2004/0049579 A1 | 3/2004 | Ims et al. |
| 2004/0049599 A1 | 3/2004 | Friend et al. |
| 2004/0051715 A1 | 3/2004 | Brokenshire et al. |
| 2004/0054739 A1 | 3/2004 | Friend et al. |
| 2004/0064445 A1 | 4/2004 | Pfleging et al. |
| 2004/0064488 A1 | 4/2004 | Sinha |
| 2004/0068579 A1 | 4/2004 | Marmigere et al. |
| 2004/0068698 A1 | 4/2004 | Wu et al. |
| 2004/0073476 A1 | 4/2004 | Donahue et al. |
| 2004/0073651 A1 | 4/2004 | Beaulieu et al. |
| 2004/0075675 A1 | 4/2004 | Raivisto et al. |
| 2004/0075695 A1 | 4/2004 | Chew et al. |
| 2004/0078814 A1 | 4/2004 | Allen |
| 2004/0080515 A1 | 4/2004 | Hagiwara |
| 2004/0082346 A1 | 4/2004 | Skytt et al. |
| 2004/0098625 A1 | 5/2004 | Lagadec et al. |
| 2004/0103147 A1 | 5/2004 | Flesher et al. |
| 2004/0107319 A1 | 6/2004 | D'Orto et al. |
| 2004/0120323 A1 | 6/2004 | Viikari et al. |
| 2004/0123304 A1 | 6/2004 | Black et al. |
| 2004/0128375 A1 | 7/2004 | Rockwell |
| 2004/0133626 A1 | 7/2004 | Herrero et al. |
| 2004/0141011 A1 | 7/2004 | Smethers et al. |
| 2004/0147248 A1 | 7/2004 | Will |
| 2004/0147262 A1 | 7/2004 | Lescuyer et al. |
| 2004/0148375 A1 | 7/2004 | Levett et al. |
| 2004/0158611 A1 | 8/2004 | Daniell et al. |
| 2004/0167966 A1 | 8/2004 | Lee et al. |
| 2004/0170257 A1 | 9/2004 | Gross et al. |
| 2004/0172481 A1 | 9/2004 | Engstrom |
| 2004/0176128 A1 | 9/2004 | Grabelsky et al. |
| 2004/0177369 A1 | 9/2004 | Akins, III |
| 2004/0179513 A1 | 9/2004 | Smith et al. |
| 2004/0181550 A1 | 9/2004 | Warsta et al. |
| 2004/0184475 A1 | 9/2004 | Meier |
| 2004/0186902 A1 | 9/2004 | Stewart |
| 2004/0189610 A1 | 9/2004 | Friend |
| 2004/0199497 A1 | 10/2004 | Timmons |
| 2004/0199582 A1 | 10/2004 | Kucharewski et al. |
| 2004/0199663 A1 | 10/2004 | Horvitz et al. |
| 2004/0205248 A1 | 10/2004 | Little et al. |
| 2004/0205330 A1 | 10/2004 | Godfrey et al. |
| 2004/0209602 A1 | 10/2004 | Joyce et al. |
| 2004/0210639 A1 | 10/2004 | Ben-Yoseph et al. |
| 2004/0219940 A1 | 11/2004 | Kong et al. |
| 2004/0230619 A1 | 11/2004 | Blanco et al. |
| 2004/0233930 A1 | 11/2004 | Colby, Jr. |
| 2004/0236792 A1 | 11/2004 | Celik |
| 2004/0252816 A1 | 12/2004 | Nicolas |
| 2004/0255126 A1 | 12/2004 | Reith |
| 2004/0258231 A1 | 12/2004 | Elsey et al. |
| 2004/0259535 A1 | 12/2004 | Elsey et al. |
| 2004/0259537 A1 | 12/2004 | Ackley |
| 2004/0260948 A1 | 12/2004 | Miyata et al. |
| 2004/0264396 A1 | 12/2004 | Ginzburg et al. |
| 2004/0266364 A1 | 12/2004 | Nguyen et al. |
| 2004/0268148 A1 | 12/2004 | Karjala et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0010694 A1 | 1/2005 | Ma et al. |
| 2005/0015432 A1 | 1/2005 | Cohen |
| 2005/0021750 A1 | 1/2005 | Abrams |
| 2005/0022182 A1 | 1/2005 | Mittal |
| 2005/0027591 A9 | 2/2005 | Gailey et al. |
| 2005/0027716 A1 | 2/2005 | Apfel |
| 2005/0027869 A1 | 2/2005 | Johnson |
| 2005/0033812 A1 | 2/2005 | McCarthy et al. |
| 2005/0033926 A1 | 2/2005 | Dumont |
| 2005/0037741 A1 | 2/2005 | Gilbert |
| 2005/0038707 A1 | 2/2005 | Roever et al. |
| 2005/0038724 A1 | 2/2005 | Roever et al. |
| 2005/0038863 A1 | 2/2005 | Onyon et al. |
| 2005/0041793 A1 | 2/2005 | Fulton et al. |
| 2005/0044144 A1 | 2/2005 | Malik et al. |
| 2005/0055578 A1 | 3/2005 | Wright et al. |
| 2005/0063544 A1 | 3/2005 | Uusitalo et al. |
| 2005/0071489 A1 | 3/2005 | Parupudi et al. |
| 2005/0071674 A1 | 3/2005 | Chou et al. |
| 2005/0073982 A1 | 4/2005 | Corneille et al. |
| 2005/0076136 A1 | 4/2005 | Cho et al. |
| 2005/0076241 A1 | 4/2005 | Appelman |
| 2005/0086540 A1 | 4/2005 | Gunter et al. |
| 2005/0094625 A1 | 5/2005 | Bouat |
| 2005/0097225 A1 | 5/2005 | Glatt et al. |
| 2005/0097570 A1 | 5/2005 | Bomers |
| 2005/0101307 A1 | 5/2005 | Brugge et al. |
| 2005/0102257 A1 | 5/2005 | Onyon et al. |
| 2005/0102328 A1 | 5/2005 | Ring et al. |
| 2005/0102351 A1 | 5/2005 | Jiang et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0120181 A1 | 6/2005 | Arunagirinathan et al. |
| 2005/0122333 A1 | 6/2005 | Sumanaweera et al. |
| 2005/0124332 A1 | 6/2005 | Clark et al. |
| 2005/0138111 A1 | 6/2005 | Aton et al. |
| 2005/0144219 A1 | 6/2005 | Terada |
| 2005/0147130 A1 | 7/2005 | Hurwitz et al. |
| 2005/0154698 A1 | 7/2005 | Ikezawa et al. |

(56) References Cited

U.S. PATENT DOCUMENTS

| | | |
|---|---|---|
| 2005/0154796 A1 | 7/2005 | Forsyth |
| 2005/0154836 A1 | 7/2005 | Steely et al. |
| 2005/0155027 A1 | 7/2005 | Wei |
| 2005/0164721 A1 | 7/2005 | Yeh et al. |
| 2005/0165909 A1 | 7/2005 | Cromer et al. |
| 2005/0170776 A1 | 8/2005 | Siorpaes |
| 2005/0183143 A1 | 8/2005 | Anderholm et al. |
| 2005/0188038 A1 | 8/2005 | Yabe |
| 2005/0193036 A1 | 9/2005 | Phillips et al. |
| 2005/0193096 A1 | 9/2005 | Yu et al. |
| 2005/0203966 A1 | 9/2005 | Labrou et al. |
| 2005/0210104 A1 | 9/2005 | Torvinen |
| 2005/0210125 A1 | 9/2005 | Li |
| 2005/0222891 A1 | 10/2005 | Chan et al. |
| 2005/0228812 A1 | 10/2005 | Hansmann et al. |
| 2005/0232295 A1 | 10/2005 | Young |
| 2005/0234860 A1 | 10/2005 | Roever et al. |
| 2005/0235214 A1 | 10/2005 | Shimizu et al. |
| 2005/0246139 A1 | 11/2005 | Rivenbark et al. |
| 2005/0248526 A1 | 11/2005 | Twerdahl et al. |
| 2005/0251555 A1 | 11/2005 | Little, II |
| 2005/0254443 A1 | 11/2005 | Campbell et al. |
| 2005/0262220 A1 | 11/2005 | Ecklund et al. |
| 2005/0273804 A1 | 12/2005 | Preisman |
| 2005/0278307 A1 | 12/2005 | Battagin et al. |
| 2005/0278641 A1 | 12/2005 | Mansour et al. |
| 2005/0278647 A1 | 12/2005 | Leavitt et al. |
| 2005/0288006 A1 | 12/2005 | Apfel |
| 2006/0012672 A1 | 1/2006 | Schrader et al. |
| 2006/0020525 A1 | 1/2006 | Borelli et al. |
| 2006/0020580 A1 | 1/2006 | Dettinger et al. |
| 2006/0020804 A1 | 1/2006 | Schleifer et al. |
| 2006/0020947 A1 | 1/2006 | Hallamaa et al. |
| 2006/0021023 A1 | 1/2006 | Stewart et al. |
| 2006/0022048 A1 | 2/2006 | Johnson |
| 2006/0026580 A1 | 2/2006 | Cabillic et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031114 A1 | 2/2006 | Zommers |
| 2006/0031300 A1 | 2/2006 | Kock et al. |
| 2006/0031365 A1 | 2/2006 | Kay et al. |
| 2006/0031428 A1 | 2/2006 | Wikman |
| 2006/0031785 A1 | 2/2006 | Raciborski |
| 2006/0037071 A1 | 2/2006 | Rao et al. |
| 2006/0046686 A1 | 3/2006 | Hawkins et al. |
| 2006/0047844 A1 | 3/2006 | Deng |
| 2006/0048061 A1 | 3/2006 | Forlenza et al. |
| 2006/0052091 A1 | 3/2006 | Onyon et al. |
| 2006/0052137 A1 | 3/2006 | Randall et al. |
| 2006/0059495 A1 | 3/2006 | Spector |
| 2006/0063544 A1 | 3/2006 | Zhao et al. |
| 2006/0069686 A1 | 3/2006 | Beyda et al. |
| 2006/0069687 A1 | 3/2006 | Cui et al. |
| 2006/0069715 A1 | 3/2006 | Vayssiere |
| 2006/0069742 A1 | 3/2006 | Segre |
| 2006/0069746 A1 | 3/2006 | Davis et al. |
| 2006/0073810 A1 | 4/2006 | Pyhalammi et al. |
| 2006/0074951 A1 | 4/2006 | Beier et al. |
| 2006/0075028 A1 | 4/2006 | Zager et al. |
| 2006/0084410 A1 | 4/2006 | Sutaria et al. |
| 2006/0085503 A1 | 4/2006 | Stoye et al. |
| 2006/0093026 A1 | 5/2006 | Montojo et al. |
| 2006/0093135 A1 | 5/2006 | Fiatal et al. |
| 2006/0099969 A1 | 5/2006 | Staton et al. |
| 2006/0112177 A1 | 5/2006 | Barkley et al. |
| 2006/0123042 A1 | 6/2006 | Xie et al. |
| 2006/0132495 A1 | 6/2006 | Anderson |
| 2006/0141962 A1 | 6/2006 | Forbes et al. |
| 2006/0143464 A1 | 6/2006 | Ananthanarayanan et al. |
| 2006/0149591 A1 | 7/2006 | Hanf et al. |
| 2006/0149843 A1 | 7/2006 | Rhoads et al. |
| 2006/0149970 A1 | 7/2006 | Imazu |
| 2006/0155822 A1 | 7/2006 | Yang et al. |
| 2006/0161621 A1 | 7/2006 | Rosenberg |
| 2006/0165226 A1 | 7/2006 | Ernst et al. |
| 2006/0168043 A1 | 7/2006 | Eisenberger et al. |
| 2006/0168164 A1 | 7/2006 | Lemson |
| 2006/0179410 A1 | 8/2006 | Deeds |
| 2006/0188864 A1 | 8/2006 | Shah |
| 2006/0190428 A1 | 8/2006 | Jung et al. |
| 2006/0190569 A1 | 8/2006 | Neil et al. |
| 2006/0190984 A1 | 8/2006 | Heard et al. |
| 2006/0192014 A1 | 8/2006 | Hamilton et al. |
| 2006/0195570 A1 | 8/2006 | Zellner et al. |
| 2006/0209842 A1 | 9/2006 | Creamer et al. |
| 2006/0212531 A1 | 9/2006 | Kikkawa et al. |
| 2006/0224629 A1 | 10/2006 | Alexander et al. |
| 2006/0230394 A1 | 10/2006 | Forth et al. |
| 2006/0240804 A1 | 10/2006 | Backholm et al. |
| 2006/0240805 A1 | 10/2006 | Backholm et al. |
| 2006/0242137 A1 | 10/2006 | Shah et al. |
| 2006/0242210 A1 | 10/2006 | Ring et al. |
| 2006/0242320 A1 | 10/2006 | Nettle et al. |
| 2006/0242607 A1 | 10/2006 | Hudson |
| 2006/0252435 A1 | 11/2006 | Henderson et al. |
| 2006/0253456 A1 | 11/2006 | Pacholec et al. |
| 2006/0253605 A1 | 11/2006 | Sundarrajan et al. |
| 2006/0259923 A1 | 11/2006 | Chiu |
| 2006/0265595 A1 | 11/2006 | Scottodiluzio |
| 2006/0271884 A1 | 11/2006 | Hurst |
| 2006/0277265 A1 | 12/2006 | Backholm et al. |
| 2006/0277271 A1 | 12/2006 | Morse et al. |
| 2006/0294071 A1 | 12/2006 | Weare et al. |
| 2006/0294223 A1 | 12/2006 | Glasgow et al. |
| 2007/0005738 A1 | 1/2007 | Alexion-Tiernan et al. |
| 2007/0011367 A1 | 1/2007 | Scott et al. |
| 2007/0019610 A1 | 1/2007 | Backholm et al. |
| 2007/0022118 A1 | 1/2007 | Layne |
| 2007/0027775 A1 | 2/2007 | Hwang |
| 2007/0027832 A1 | 2/2007 | Fiatal et al. |
| 2007/0027886 A1 | 2/2007 | Gent et al. |
| 2007/0027917 A1 | 2/2007 | Ariel et al. |
| 2007/0027920 A1 | 2/2007 | Alvarado et al. |
| 2007/0027921 A1 | 2/2007 | Alvarado et al. |
| 2007/0027930 A1 | 2/2007 | Alvarado et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0044041 A1 | 2/2007 | Beynon et al. |
| 2007/0049258 A1 | 3/2007 | Thibeault |
| 2007/0060196 A1 | 3/2007 | Sharma |
| 2007/0061393 A1 | 3/2007 | Moore |
| 2007/0067147 A1 | 3/2007 | Huang |
| 2007/0067381 A1 | 3/2007 | Grant et al. |
| 2007/0067424 A1 | 3/2007 | Raciborski et al. |
| 2007/0070931 A1 | 3/2007 | Lewis et al. |
| 2007/0078857 A1 | 4/2007 | Punaganti et al. |
| 2007/0078964 A1 | 4/2007 | East et al. |
| 2007/0088852 A1 | 4/2007 | Levkovitz |
| 2007/0105627 A1 | 5/2007 | Campbell |
| 2007/0116223 A1 | 5/2007 | Burke et al. |
| 2007/0118620 A1 | 5/2007 | Cartmell et al. |
| 2007/0130108 A1 | 6/2007 | Simpson et al. |
| 2007/0130217 A1 | 6/2007 | Linyard et al. |
| 2007/0140193 A1 | 6/2007 | Dosa et al. |
| 2007/0147317 A1 | 6/2007 | Smith et al. |
| 2007/0150881 A1 | 6/2007 | Khawand et al. |
| 2007/0156824 A1 | 7/2007 | Thompson |
| 2007/0156842 A1 | 7/2007 | Vermeulen et al. |
| 2007/0162514 A1 | 7/2007 | Civetta et al. |
| 2007/0167178 A1 | 7/2007 | Al-Harbi |
| 2007/0174433 A1 | 7/2007 | Mendez et al. |
| 2007/0175998 A1 | 8/2007 | Lev |
| 2007/0198698 A1 | 8/2007 | Boyd et al. |
| 2007/0220080 A1 | 9/2007 | Humphrey |
| 2007/0233855 A1 | 10/2007 | Brown et al. |
| 2007/0237318 A1 | 10/2007 | McGary |
| 2007/0245010 A1 | 10/2007 | Arn et al. |
| 2007/0249365 A1 | 10/2007 | Jendbro |
| 2007/0250591 A1 | 10/2007 | Milic-Frayling et al. |
| 2007/0264993 A1 | 11/2007 | Hughes |
| 2007/0267492 A1 | 11/2007 | Maclaine Pont |
| 2007/0276925 A1 | 11/2007 | LaJoie et al. |

(56) References Cited

U.S. PATENT DOCUMENTS

| | | |
|---|---|---|
| 2007/0276926 A1 | 11/2007 | LaJoie et al. |
| 2007/0288469 A1 | 12/2007 | Shenfield |
| 2007/0290787 A1 | 12/2007 | Fiatal et al. |
| 2007/0293207 A1 | 12/2007 | Guedalia et al. |
| 2007/0293238 A1 | 12/2007 | Fiatal et al. |
| 2007/0293958 A1 | 12/2007 | Stehle et al. |
| 2007/0294295 A1 | 12/2007 | Finkelstein et al. |
| 2007/0294763 A1 | 12/2007 | Udezue et al. |
| 2007/0296701 A1 | 12/2007 | Pope et al. |
| 2008/0001717 A1 | 1/2008 | Fiatal |
| 2008/0008095 A1 | 1/2008 | Gilfix |
| 2008/0009344 A1 | 1/2008 | Graham et al. |
| 2008/0016236 A1 | 1/2008 | Beverly et al. |
| 2008/0032718 A1 | 2/2008 | Suresh |
| 2008/0034031 A1 | 2/2008 | Weisbrot et al. |
| 2008/0037787 A1 | 2/2008 | Boynton et al. |
| 2008/0059308 A1 | 3/2008 | Gerken |
| 2008/0059398 A1 | 3/2008 | Tsutsui |
| 2008/0061142 A1 | 3/2008 | Howcroft et al. |
| 2008/0068519 A1 | 3/2008 | Adler et al. |
| 2008/0077506 A1 | 3/2008 | Rampell et al. |
| 2008/0077571 A1 | 3/2008 | Harris et al. |
| 2008/0085719 A1 | 4/2008 | Kuchibhotla et al. |
| 2008/0085724 A1 | 4/2008 | Cormier et al. |
| 2008/0086379 A1 | 4/2008 | Dion et al. |
| 2008/0103877 A1 | 5/2008 | Gerken |
| 2008/0104666 A1 | 5/2008 | Dillaway |
| 2008/0114881 A1 | 5/2008 | Lee et al. |
| 2008/0125225 A1 | 5/2008 | Lazaridis |
| 2008/0130663 A1 | 6/2008 | Fridman et al. |
| 2008/0133326 A1 | 6/2008 | Goncalves et al. |
| 2008/0133641 A1 | 6/2008 | Gent et al. |
| 2008/0133708 A1 | 6/2008 | Alvarado et al. |
| 2008/0134292 A1 | 6/2008 | Ariel et al. |
| 2008/0140665 A1 | 6/2008 | Ariel et al. |
| 2008/0151817 A1 | 6/2008 | Fitchett et al. |
| 2008/0154870 A1 | 6/2008 | Evermann et al. |
| 2008/0155613 A1 | 6/2008 | Benya et al. |
| 2008/0166999 A1 | 7/2008 | Guedalia et al. |
| 2008/0167019 A1 | 7/2008 | Guedalia et al. |
| 2008/0168145 A1 | 7/2008 | Wilson |
| 2008/0183800 A1 | 7/2008 | Herzog et al. |
| 2008/0192820 A1 | 8/2008 | Brooks et al. |
| 2008/0198995 A1 | 8/2008 | McGary et al. |
| 2008/0201362 A1 | 8/2008 | Multer et al. |
| 2008/0201751 A1 | 8/2008 | Ahmed et al. |
| 2008/0207182 A1 | 8/2008 | Maharajh et al. |
| 2008/0209491 A1 | 8/2008 | Hasek |
| 2008/0214148 A1 | 9/2008 | Ramer et al. |
| 2008/0216094 A1 | 9/2008 | Anderson et al. |
| 2008/0220797 A1 | 9/2008 | Meiby et al. |
| 2008/0232290 A1 | 9/2008 | Elzur et al. |
| 2008/0233983 A1 | 9/2008 | Park et al. |
| 2008/0270379 A1 | 10/2008 | Ramakrishna |
| 2008/0273498 A1 | 11/2008 | Jalil et al. |
| 2008/0281798 A1 | 11/2008 | Chatterjee et al. |
| 2008/0288659 A1 | 11/2008 | Hasha et al. |
| 2008/0298386 A1 | 12/2008 | Fiatal |
| 2008/0299956 A1 | 12/2008 | Bailey et al. |
| 2008/0301231 A1 | 12/2008 | Mehta et al. |
| 2008/0301300 A1 | 12/2008 | Toub |
| 2008/0313282 A1 | 12/2008 | Warila et al. |
| 2009/0010204 A1 | 1/2009 | Pratt, Jr. et al. |
| 2009/0010259 A1 | 1/2009 | Sirotkin |
| 2009/0012841 A1 | 1/2009 | Saft et al. |
| 2009/0016526 A1 | 1/2009 | Fiatal et al. |
| 2009/0019485 A1 | 1/2009 | Ellis et al. |
| 2009/0019532 A1 | 1/2009 | Jacobsen et al. |
| 2009/0031006 A1 | 1/2009 | Johnson |
| 2009/0052372 A1 | 2/2009 | Durazzo et al. |
| 2009/0054034 A1 | 2/2009 | Backholm et al. |
| 2009/0055353 A1 | 2/2009 | Meema |
| 2009/0063647 A1 | 3/2009 | Backholm et al. |
| 2009/0075683 A1 | 3/2009 | Backholm et al. |
| 2009/0077263 A1 | 3/2009 | Koganti et al. |
| 2009/0094317 A1 | 4/2009 | Venkitaraman |
| 2009/0110179 A1 | 4/2009 | Elsey et al. |
| 2009/0119266 A1 | 5/2009 | Fitzpatrick et al. |
| 2009/0125523 A1 | 5/2009 | Fitzpatrick et al. |
| 2009/0144632 A1 | 6/2009 | Mendez |
| 2009/0147008 A1 | 6/2009 | Do et al. |
| 2009/0149203 A1 | 6/2009 | Backholm et al. |
| 2009/0156178 A1 | 6/2009 | Elsey et al. |
| 2009/0157792 A1 | 6/2009 | Fiatal |
| 2009/0164433 A1 | 6/2009 | R et al. |
| 2009/0164560 A1 | 6/2009 | Fiatal |
| 2009/0172565 A1 | 7/2009 | Jackson et al. |
| 2009/0181641 A1 | 7/2009 | Fiatal |
| 2009/0182500 A1 | 7/2009 | Dicke |
| 2009/0187939 A1 | 7/2009 | Lajoie |
| 2009/0191903 A1 | 7/2009 | Fiatal |
| 2009/0193130 A1 | 7/2009 | Fiatal |
| 2009/0193338 A1 | 7/2009 | Fiatal |
| 2009/0215504 A1 | 8/2009 | Lando |
| 2009/0221326 A1 | 9/2009 | Roussel et al. |
| 2009/0228545 A1 | 9/2009 | Mendez et al. |
| 2009/0241180 A1 | 9/2009 | Fiatal |
| 2009/0248670 A1 | 10/2009 | Fiatal |
| 2009/0248696 A1 | 10/2009 | Rowles et al. |
| 2009/0248794 A1 | 10/2009 | Helms et al. |
| 2009/0248878 A1 | 10/2009 | Tran et al. |
| 2009/0252136 A1 | 10/2009 | Mahany et al. |
| 2009/0254589 A1 | 10/2009 | Nair et al. |
| 2009/0264138 A1 | 10/2009 | Kang et al. |
| 2009/0282125 A1 | 11/2009 | Jeide et al. |
| 2009/0286531 A1 | 11/2009 | Bhatt et al. |
| 2009/0287750 A1 | 11/2009 | Banavar et al. |
| 2009/0299817 A1 | 12/2009 | Fok et al. |
| 2009/0307133 A1 | 12/2009 | Holloway et al. |
| 2009/0318171 A1 | 12/2009 | Backholm et al. |
| 2009/0323678 A1 | 12/2009 | Wang |
| 2009/0325565 A1 | 12/2009 | Backholm |
| 2009/0327390 A1 | 12/2009 | Tran et al. |
| 2010/0042691 A1 | 2/2010 | Maguire |
| 2010/0057924 A1 | 3/2010 | Rauber et al. |
| 2010/0077035 A1 | 3/2010 | Li et al. |
| 2010/0077083 A1 | 3/2010 | Tran et al. |
| 2010/0083255 A1 | 4/2010 | Bane et al. |
| 2010/0087167 A1 | 4/2010 | Tsurutome et al. |
| 2010/0088722 A1 | 4/2010 | Jiang |
| 2010/0093273 A1 | 4/2010 | Hohl |
| 2010/0115050 A1 | 5/2010 | Sultenfuss et al. |
| 2010/0118190 A1 | 5/2010 | Salfati et al. |
| 2010/0131593 A1 | 5/2010 | Kihara et al. |
| 2010/0131617 A1 | 5/2010 | Osborne et al. |
| 2010/0146107 A1 | 6/2010 | Fiatal |
| 2010/0149975 A1 | 6/2010 | Tripathi et al. |
| 2010/0174735 A1 | 7/2010 | Fiatal |
| 2010/0174939 A1 | 7/2010 | Vexler |
| 2010/0207870 A1 | 8/2010 | Cho |
| 2010/0211651 A1 | 8/2010 | Guedalia et al. |
| 2010/0228863 A1 | 9/2010 | Kawauchi |
| 2010/0238915 A1 | 9/2010 | Cayla et al. |
| 2010/0250986 A1 | 9/2010 | Black et al. |
| 2010/0268757 A1 | 10/2010 | Fisher |
| 2010/0279662 A1 | 11/2010 | Kuusinen et al. |
| 2010/0313018 A1 | 12/2010 | Jorgensen |
| 2010/0319054 A1 | 12/2010 | Mehta et al. |
| 2011/0040718 A1 | 2/2011 | Tendjoukian et al. |
| 2011/0065424 A1 | 3/2011 | Estevez et al. |
| 2011/0113109 A1 | 5/2011 | LeVasseur et al. |
| 2011/0119134 A1 | 5/2011 | Zivkovic et al. |
| 2011/0138402 A1 | 6/2011 | Fleming |
| 2011/0165889 A1 | 7/2011 | Fiatal et al. |
| 2011/0179138 A1 | 7/2011 | Van Geest et al. |
| 2011/0179377 A1 | 7/2011 | Fleming |
| 2011/0184827 A1 | 7/2011 | Hubert |
| 2011/0190014 A1 | 8/2011 | Fiatal |
| 2011/0191474 A1 | 8/2011 | Fiatal |
| 2011/0201304 A1 | 8/2011 | Sutaria et al. |
| 2011/0207436 A1 | 8/2011 | van Gent et al. |
| 2011/0208810 A1 | 8/2011 | Li et al. |
| 2011/0213800 A1 | 9/2011 | Saros et al. |
| 2011/0213898 A1 | 9/2011 | Fiatal et al. |

(56) References Cited

U.S. PATENT DOCUMENTS

| | | |
|---|---|---|
| 2011/0238772 A1 | 9/2011 | Fiatal |
| 2011/0246950 A1 | 10/2011 | Luna et al. |
| 2011/0252088 A1 | 10/2011 | Fiatal |
| 2011/0264622 A1 | 10/2011 | Vargas et al. |
| 2011/0264731 A1 | 10/2011 | Knowles et al. |
| 2011/0294463 A1 | 12/2011 | Fiatal |
| 2011/0294464 A1 | 12/2011 | Fiatal |
| 2011/0296050 A1 | 12/2011 | Cherukuri |
| 2011/0302154 A1 | 12/2011 | Snyder |
| 2012/0022980 A1 | 1/2012 | Angelone |
| 2012/0023190 A1 | 1/2012 | Backholm et al. |
| 2012/0023226 A1 | 1/2012 | Petersen et al. |
| 2012/0023236 A1 | 1/2012 | Backholm et al. |
| 2012/0072910 A1 | 3/2012 | Martin et al. |
| 2012/0077482 A1 | 3/2012 | Backholm |
| 2012/0078996 A1 | 3/2012 | Shah |
| 2012/0096092 A1 | 4/2012 | Davidge et al. |
| 2012/0108225 A1 | 5/2012 | Luna et al. |
| 2012/0131095 A1 | 5/2012 | Luna et al. |
| 2012/0131184 A1 | 5/2012 | Luna et al. |
| 2012/0135726 A1 | 5/2012 | Luna et al. |
| 2012/0149352 A1 | 6/2012 | Backholm et al. |
| 2012/0151044 A1 | 6/2012 | Luna et al. |
| 2012/0157170 A1 | 6/2012 | Backholm et al. |
| 2012/0158908 A1 | 6/2012 | Luna et al. |
| 2012/0173616 A1 | 7/2012 | Luna et al. |

FOREIGN PATENT DOCUMENTS

| | | |
|---|---|---|
| EP | 1422899 A1 | 5/2004 |
| EP | 1466261 A1 | 10/2004 |
| EP | 1466435 A1 | 10/2004 |
| EP | 1482702 A1 | 12/2004 |
| EP | 1815634 A1 | 8/2007 |
| EP | 1815652 A1 | 8/2007 |
| EP | 1817883 A1 | 8/2007 |
| FI | 117152 B | 6/2006 |
| FI | 118288 B | 9/2007 |
| FI | 119581 B | 12/2008 |
| JP | 4154233 A | 5/1992 |
| JP | 10-336372 A | 12/1998 |
| JP | 2001-218185 A | 8/2001 |
| JP | 2001-350718 A | 12/2001 |
| JP | 2001-356973 A | 12/2001 |
| JP | 2005-515664 T | 5/2005 |
| JP | 2009-207177 A | 9/2009 |
| JP | 4386732 B2 | 10/2009 |
| KR | 2001-0018568 A | 3/2001 |
| KR | 2006-0068186 A | 6/2006 |
| KR | 2007-0071858 A1 | 7/2007 |
| KR | 2007-0102091 A1 | 10/2007 |
| KR | 2007-0117874 A | 12/2007 |
| KR | 2009-0077515 A | 7/2009 |
| KR | 2010-0064605 A | 6/2010 |
| WO | WO 97/41661 A2 | 11/1997 |
| WO | WO 98/24257 A1 | 6/1998 |
| WO | WO 98/58322 A2 | 12/1998 |
| WO | WO 01/30130 A2 | 5/2001 |
| WO | WO 03/007570 A1 | 1/2003 |
| WO | WO 03/058483 A1 | 7/2003 |
| WO | WO 03/058879 A1 | 7/2003 |
| WO | WO 03/065701 A1 | 8/2003 |
| WO | WO 03/098890 A1 | 11/2003 |
| WO | WO 2004/017591 A2 | 2/2004 |
| WO | WO 2004/045171 A1 | 5/2004 |
| WO | WO 2005/015925 A2 | 2/2005 |
| WO | WO 2005/020108 A1 | 3/2005 |
| WO | WO 2006/045005 A2 | 4/2006 |
| WO | WO 2006/045102 A2 | 4/2006 |
| WO | WO 2006/053952 A1 | 5/2006 |
| WO | WO 2006/053954 A1 | 5/2006 |
| WO | WO 2006/058967 A1 | 6/2006 |
| WO | WO 2007/015725 A2 | 2/2007 |
| WO | WO 2007/015726 A1 | 2/2007 |
| WO | WO 2007/149526 A2 | 12/2007 |
| WO | WO 2007/149540 A2 | 12/2007 |
| WO | WO 2008061042 A2 | 5/2008 |
| WO | WO 2011/126889 A2 | 10/2011 |
| WO | WO 2012/018430 A1 | 2/2012 |
| WO | WO 2012/018431 A1 | 2/2012 |
| WO | WO 2012/018477 A2 | 2/2012 |
| WO | WO 2012/018479 A2 | 2/2012 |
| WO | WO 2012/018556 A2 | 2/2012 |
| WO | WO 2012/024030 A2 | 2/2012 |
| WO | WO 2012/060995 A2 | 5/2012 |
| WO | WO 2012/060996 A2 | 5/2012 |
| WO | WO 2012/060997 A2 | 5/2012 |
| WO | WO 2012/061430 A2 | 5/2012 |
| WO | WO 2012/061433 A2 | 5/2012 |
| WO | WO 2012/061437 A1 | 5/2012 |
| WO | WO 2012/071283 A1 | 5/2012 |
| WO | WO 2012/071384 A2 | 5/2012 |

OTHER PUBLICATIONS

International Application No. PCT/US2011/056474, International Search Report, 9 pages, May 4, 2012.
International Application No. PCT/US2011/056476, International Search Report, 12 pages, May 24, 2012.
International Application No. PCT/US2011/056478, International Search Report, 11 pages, May 31, 2012.
International Application No. PCT/US2012/021459, International Search Report, 10 pages, Jun. 1, 2012.
Seven Networks, Inc., "Seven Optimizing The Mobile Ecosystem," www.seven.com/products.traffic_optimization.php, 1 page, May 29, 2012.
Wikipedia, Definition for "General Packet Radio Service," 7 pages, downloaded on May 31, 2012.
Allchin, James Edward, "An Architecture For Reliable Decentralized Systems," Ph.D. Thesis, Georgia Institute of Technology, 185 pages, Sep. 1983.
Android Developers, "Date," 10 pages, Oct. 27, 2011.
Augun, Audrey, "Integrating Lotus Notes With Enterprise Data," Lotus Notes Advisory, pp. 22-25, Jul.-Aug. 1996.
Balaban, Bob, "This Is Not Your Father's Basic: LotusScript in Notes Release 4," The View, vol. 1, Issue 5, 32 pages, Nov.-Dec. 1995.
Bedell, Doug, "Meeting Your New Best Friends Six Degrees Widens Your Contacts in Exchange For Sampling Web Sites," The Dallas Morning News, 4 pages, Oct. 27, 1998.
Bergman, Lawrence D. et al., "Programming-By-Demonstration For Behavior-Based User Interface Customization," IBM Research Report, RC23116, 5 pages, Feb. 20, 2004.
B'Far, Reza et al., "Designing Effective User Interfaces for Wireless Devices," Publication Unknown, 14 pages, Published prior to Feb. 23, 2006.
Blaney, Jeff, "You Can Take It With You—An Introduction to Mobile Computing With Notes R4," The View, vol. 2, Issue 1, 14 pages, Jan.-Feb. 1996.
Braden, R., "Requirements For Internet Hosts—Application And Support," RFC 1123, 80 pages, Oct. 1989.
Brown, Kevin et al., "Mastering Lotus Notes®," Sybex Inc., 996 pages, 1995.
"Chapter: About NotesPump," Publication Unknown, 480 pages, Published prior to Jan. 8, 2003.
"Chapter 13-1—Anatomy of a Note ID," Publication Unknown, 8 pages, Published prior to Jan. 8, 2003.
Cole, Barb et al., "Lotus Airs Notes-To-Database Integration Tool," Network World, 2 pages, Oct. 2, 1995.
"CR 3483 to Release 8 TS 25.331, Rev. 2," 3GPP TSG-RAN2 Meeting #64, Prague, Czech Republic, 11 pages, Nov. 10-14, 2008.
"CR 4100 to Release 8 TS 25.331, Rev. 1," 3GPP TSG-RAN WG2 Meeting #69, San Francisco, U.S., 6 pages, Feb. 22-26, 2010.
Dahl, Andrew, "Lotus Notes® 4 Administrator's Survival Guide," Sams Publishing, 64 pages, 1996.
Decker, Stefan et al., "The Social Semantic Desktop," Digital Enterprise Research Institute, DERI Technical Report May 2, 2004, 7 pages, May 2004.

(56) References Cited

OTHER PUBLICATIONS

Elz, R. et al., "Clarifications To The DNS Specification," RFC 2181, 12 pages, Jul. 1997.
European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
European Patent Application No. EP 05815115.0, Supplementary European Search Report, 7 pages, Nov. 17, 2011.
Falkner, Mike, "How To Plan, Develop, And Implement Lotus Notes® In Your Organization," John Wiley & Sons, Inc., 539 pages, 1996.
Freeland, Pat et al., "Lotus Notes 3-3.1 For Dummies™," IDG Books Worldwide, 389 pages, 1994.
Frenkel, Garry, "Pumping For Info: Notes And Database Integration," Network Computing, 10 pages, May 1, 1996.
Gameline, Advertisement, 1 page, 1982.
Gewirtz, David, "Lotus Notes 3 Revealed!," Prima Publishing, 261 pages, 1994.
Grous, Paul J., "Creating And Managing A Web Site With Lotus Internotes Web Publisher," The View, vol. 1, Issue 4, 20 pages, Sep.-Oct. 1995.
GSM Association, "Network Efficiency Task Force Fast Dormancy Best Practices," V1.0, 21 pages, May 26, 2010.
Haas, Zygmunt J. et al., "Mobile-TCP: An Asymmetric Transport Protocol Design For Mobile Systems," IEEE, pp. 1054-1058, 1997.
Haas, Zygmunt J. et al., "The Design and Performance Of Mobile TCP For Wireless Networks," Journal of High Speed Networks, vol. 10, pp. 187-207, 2001.
Hajdu, Kalman et al., "Lotus Notes Release 4 In A Multiplatform Environment," IBM Corporation, 173 pages, Feb. 1996.
Hardy, Ed, "Microsoft Proposes Two New Thumb-Driven User Interfaces," Brighthand Consulting, Inc., 2 pages, 2003.
IBM Corporation, "The Architecture Of Lotus Notes," White Paper No. 114654, 26 pages, May 31, 1995.
IBM Corporation, "The History Of Notes And Domino," Lotus Developer Domain, 11 pages, Sep. 29, 2003.
ImTOO, "ImTOO iPod Movie Converter," 3 pages, Nov. 9, 2005.
IntelliLink Corporation, "IntelliLink® for Windows User's Guide," Version 3.0, 167 pages, 1994.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/US2005/038135, International Preliminary Report on Patentability, 9 pages, Oct. 31, 2011.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
International Application No. PCT/US2011/030534, International Search Report, 10 pages, Dec. 29, 2011.
International Application No. PCT/US2011/037932, International Search Report, 9 pages, Jan. 2, 2012.
International Application No. PCT/US2011/037943, International Search Report, 11 pages, Jan. 2, 2012.
International Application No. PCT/US2011/043322, International Search Report, 9 pages, Feb. 9, 2012.
International Application No. PCT/US2011/043328, International Search Report, 12 pages, Feb. 27, 2012.
International Application No. PCT/US2011/043409, International Search Report, 11 pages, Feb. 9, 2012.
International Application No. PCT/US2011/058840, International Search Report, 10 pages, Apr. 26, 2012.
International Application No. PCT/US2011/058843, International Search Report, 11 pages, May 16, 2012.
International Application No. PCT/US2011/058848, International Search Report, 10 pages, Apr. 10, 2012.
International Application No. PCT/US2011/061512, International Search Report, 10 pages, May 10, 2012.
International Application No. PCT/US2012/022121, International Search Report, 11 pages, May 14, 2012.
Japanese Patent Application No. 2003-558726, Office Action, 2 pages, Jun. 10, 2008.
Karlson, Amy K. et al., "AppLens And LaunchTile: Two Designs for One-Handed Thumb Use on Small Devices," Proceedings of CHI 2005, 10 pages, Apr. 2-7, 2005.
Kent, S. et al., "Security Architecture For The Internet Protocol," RFC 2401, The Internet Society, 62 pages, Nov. 1998.
Kleinberg, Jon, "The Small-World Phenomenon: An Algorithmic Perspective," Cornell Computer Science Technical Report 99-1776, 14 pages, Oct. 1999.
Koeppel, Dan, "GUIs Just Want To Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 For Dummies®," IDG Books Worldwide, 229 pages, 1996.
Lotus Development Corporation, "Firewall Security Overview And How Firewalls Relate To Lotus Notes," Lotus Notes Knowledge Base, 9 pages, May 22, 1996.
Lotus Development Corporation, "How To Set Up 'Firewall' Protection For A Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture Of Notes And The Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration For Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrators Guide," Release 4, 499 pages, 1995.
Lotus Development Corporation, "Lotus Notes Administrators Guide—Server For NetWare, OS-2, And Unix," Release 3.1, 509 pages, 1994.
Lotus Development Corporation, "Lotus Notes Administrator's Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Published prior to Jan. 8, 2003.

(56) References Cited

OTHER PUBLICATIONS

Lotus Development Corporation, "Lotus Notes Customer Support Guide—North American Guide," Release 4.1, 51 pages, Published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes For Windows, OS-2, And Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide For Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide For Workstations," Release 4.1, 67 pages, 1996.
Lotus Development Corporation, "Lotus Notes Install Guide For Workstations," Release 4.5, 81 pages, 1996.
Lotus Development Corporation, "Lotus Notes Internet Cookbook For Notes Release 3," 21 pages, Jan. 16, 1996.
Lotus Development Corporation, "Lotus Notes Internet Cookbook For Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes For Notes," Release 4, 6 pages, Published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference For Application Developers," Release 3, 6 pages, Published prior to Jan. 8, 2003.
Lotus Development Corporation, "Lotus Notes Quick Reference For Macintosh," Release 3, 6 pages, Published prior to Jan. 8, 2003.
Lotus Development Corporation, "Lotus Notes Quick Reference For SmartIcons," Release 3.1, 4 pages, Published prior to Jan. 8, 2003.
Lotus Development Corporation, "Lotus Notes Quick Reference For Windows And Presentation Manager," Release 3, 6 pages, Published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server For Windows," Release 3.3, 7 pages, 1994.
Lotus Development Corporation, "Lotus Notes Server Up And Running!," Release 4, 13 pages, 1996.
Lotus Development Corporation, "Lotus Notes Site And Systems Planning Guide," Release 3.1, 169 pages, 1994.
Lotus Development Corporation, "Lotus Notes Start Here—Workstation Install For Windows, OS-2 And Macintosh," Release 3.3, 47 pages, 1995.
Lotus Development Corporation, "Lotus Notes Step By Step—A Beginner's Guide To Lotus Notes," Release 4, 179 pages, 1995.
Lotus Development Corporation, "Lotus Notes Step By Step—A Beginner's Guide To Lotus Notes," Release 4.1, 167 pages, 1996.
Lotus Development Corporation, "Lotus Software Agreement," 8 pages, Published prior to Jan. 8, 2003.
Lotus Development Corporation, "What Is The Notes Replicator?," Lotus Notes Knowledge Base, 8 pages, Jul. 5, 1995.
"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc. 55 pages, Oct. 1995.
"Lotus Notes Advisor," Advisor Publications Inc. 55 pages, Dec. 1995.
"Lotus Notes Advisor," Advisor Publications Inc. 63 pages, Jan.-Feb. 1996.
"Lotus Notes Advisor," Advisor Publications Inc. 55 pages, Apr. 1996.
"Lotus Notes Advisor," Advisor Publications Inc. 55 pages, Jun. 1996.
"Lotus Notes Advisor," Advisor Publications Inc. 55 pages, Aug. 1996.
"Lotus Notes Advisor," Advisor Publications Inc. 55 pages, Oct. 1996.
"Lotus Notes Advisor," Advisor Publications Inc. 63 pages, Dec. 1996.
"Lotus Notes—Notes Administration Help," Screen Shots, 17 pages, Published prior to Jan. 8, 2003.
MacGregor, Rob et al., "The Domino Defense: Security In Lotus Notes And The Internet," IBM Corporation, 183 pages, Dec. 1997.
Maltz, David A. et al., "MSOCKS: An Architecture For Transport Layer Mobility," IEEE, pp. 1037-1045, 1998.
Marmel, Elaine, "Easy Lotus® Notes Release 4.0," Que Corporation, 237 pages, 1996.
Mason, Luke, "Windows XP: New GUI Design Shows Skin Is In," TechRepublic, 4 pages, Apr. 4, 2001.
McMullen, Melanie, "Network Remote Access And Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves In Cryptography," Advances In Cryptology—CRYPTO '85 Proceedings, vol. 218, pp. 417-426, 1985.
Mockapetris, P., "Domain Names—Concepts And Facilities," RFC 1034, 43 pages, Nov. 1987.
Mockapetris, P., "Domain Names—Implementation And Specification," RFC 1035, 43 pages, Nov. 1987.
Myers, Brad A. et al., "Extending The Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held And Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.

(56) References Cited

OTHER PUBLICATIONS

Niederée, Claudia et al., "A Multi-Dimensional, Unified User Model For Cross-System Personalization," Proceedings of the AVI 2004 Workshop on Environments for Personalized Information Access, 11 pages, 2004.

Nokia, "Developer Platforms," 3 pages, 2005.

"NotesPump 1.0 Release Notes," Publication Unknown, 8 pages, Published prior to Jan. 8, 2003.

Opyt, Barbara et al., "Use The Internet As Your Lotus Notes WAN," Lotus Notes Advisor, pp. 17-20, Nov.-Dec. 1996.

Ortiz, C. Enrique, "An Introduction To The Symbian OS™ Platform For Palm OS® Developers," Metrowerks Corp., 21 pages, 2002.

"Overview—What Is Lotus NotesPump?," Publication Unknown, 88 pages, Published prior to Jan. 8, 2003.

Perez, Sarah, "Onavo's Data-Compressing Mobile App Raises $10 Million Series B From Horizons, Motorola Ventures," 2 pages, Jan. 24, 2012.

Phillips, Joshua et al., "Modeling The Intelligence Analysis Process For Intelligent User Agent Development," Research and Practice in Human Resource Management, vol. 9, No. 1, pp. 59-73, 2001.

Pyle, Hugh, "The Architecture of Lotus Notes," Lotus Notes Advisor, Premiere Issue, pp. 18-27, 1995.

Pyle, Lisa, "A Jump Start To The Top Ten R3-To-R4 Migration Considerations," The View, vol. 1, Issue 5, 22 pages, Nov.-Dec. 1995.

Qualcomm Incorporated, "Managing Background Data Traffic In Mobile Devices," 16 pages, Jan. 2012.

Qualcomm, "System Parameter Recommendations To Optimize PS Data User Experience And UE Battery Life," 80-W1112-1, Revision B, 9 pages, Mar. 2007.

Ringel, Meredith et al., "iStuff: A Scalable Architecture For Lightweight, Wireless Devices For Ubicomp User Interfaces," Proceedings of UbiComp 2002, 2 pages, 2002.

Shafran, Andrew Bryce, "Easy Lotus Notes® For Windows™," Que Corporation, 199 pages, 1994.

Signorini, Eugene, "SEVEN's Service-Based Wireless Solutions Enable Enterprises To Untether E-Mail," Wireless/Mobile Enterprise & Commerce, 16 pages, Oct. 2004.

Swedeen, Bret et al., "Under The Microscope—Domino Replication," LDD Today, 8 pages, Oct. 1, 1998.

Tamura, Randall A., "Lotus® Notes™ 4 Unleashed," Sams Publishing, 928 pages, 1996.

U.S. Appl. No. 60/663,463, File History, 113 pages, Mar. 18, 2005.

Vivacqua, Adriana et al., "Profiling and Matchmaking Strategies In Support Of Opportunistic Collaboration," CoopIS/DOA/ODBASE 2003, LNCS 2888, pp. 162-177, 2003.

Wainwright, Andrew, "Secrets To Running Lotus Notes: The Decisions No One Tells You How To Make," IBM Corporation, 193 pages, Oct. 1996.

Wilcox, Adam A., "PC Learning Labs Teaches Lotus Notes 3.0," Ziff-Davis Press, 381 pages, 1993.

Wong, Harry, "Casahl's Replic-Action: Delivering True Notes-DBMS Integration," The View, vol. 2, Issue 1, pp. 33-50, Jan.-Feb. 1996.

\* cited by examiner

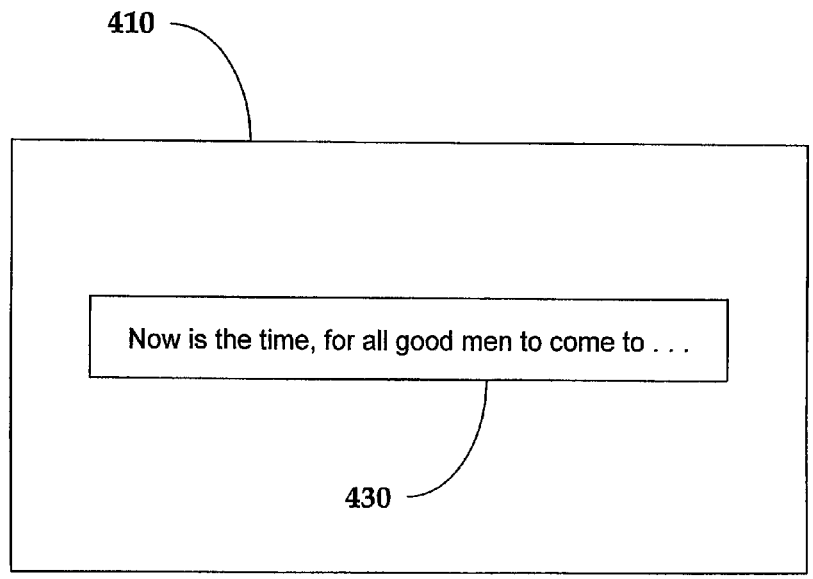
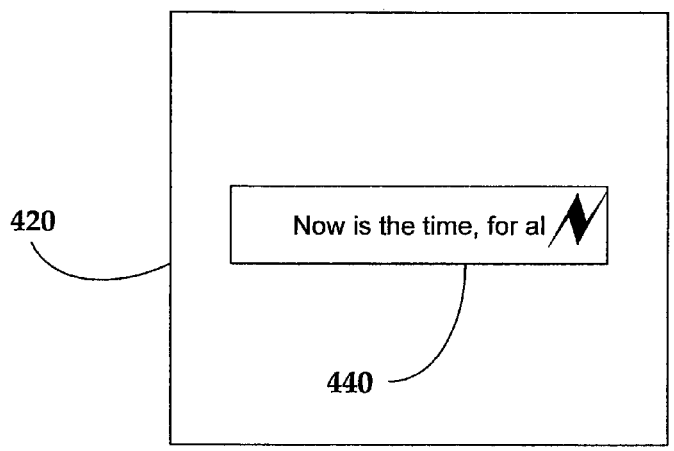
FIGURE 4B
PRIOR ART

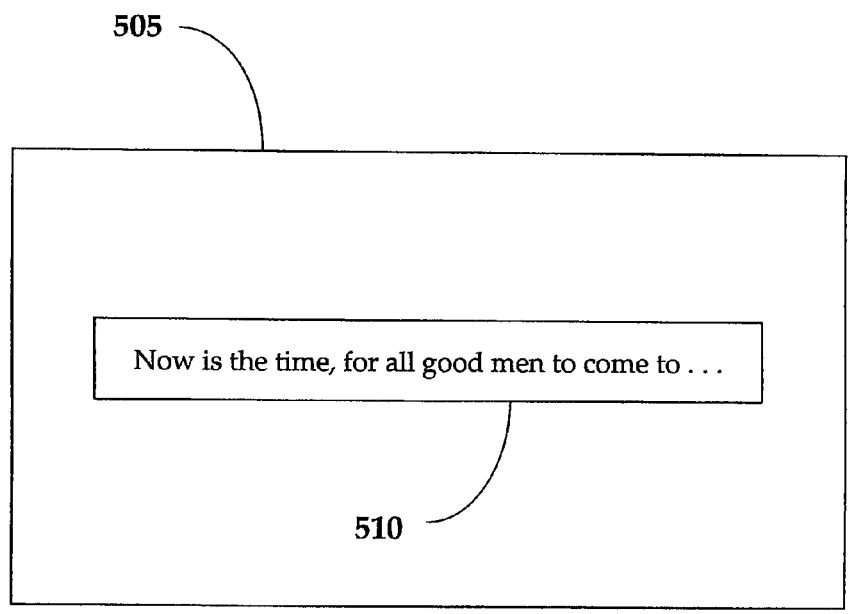
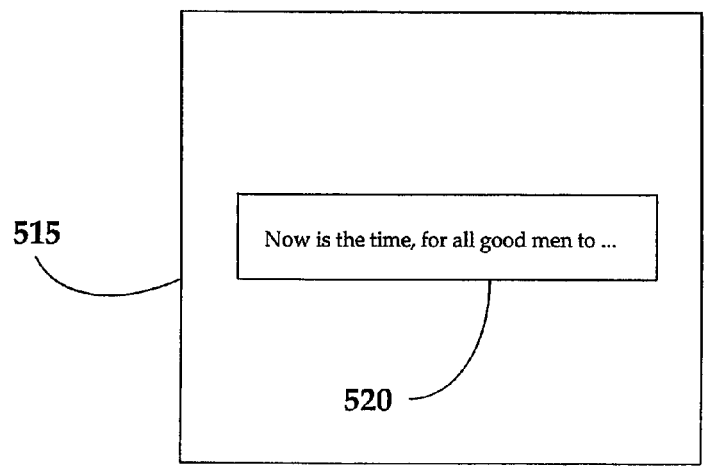
FIGURE 5A

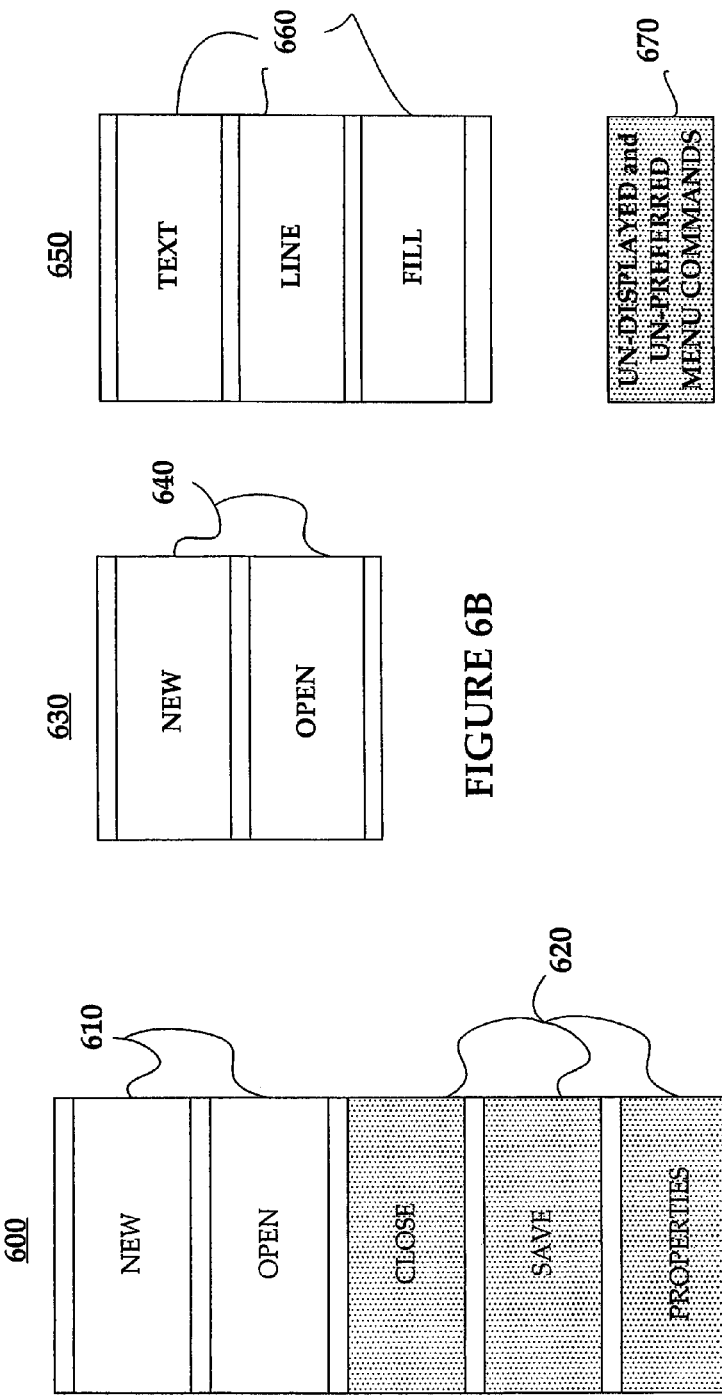

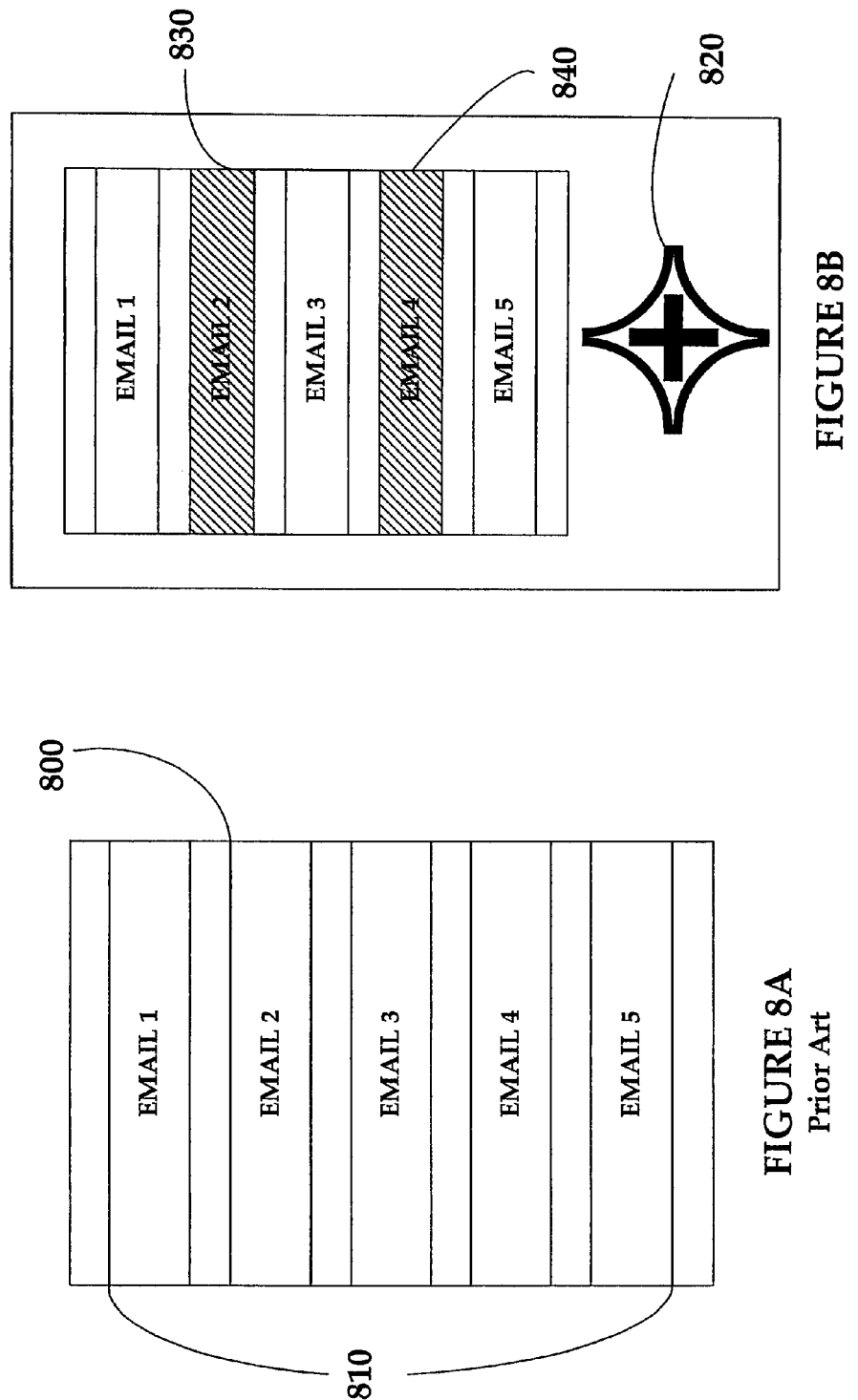

INTELLIGENT RENDERING OF INFORMATION IN A LIMITED DISPLAY ENVIRONMENT

CROSS-REFERENCE TO RELATED APPLICATIONS

This application is a Continuation of U.S. patent application Ser. No. 11/227,013, filed Sep. 14, 2005, titled "INTELLIGENT RENDERING FOR INFORMATION FOR A LIMITED DISPLAY ENVIRONMENT, now U.S. Pat. No. 7,877, 703 issued Jan. 25, 2012, which claims the priority benefit of U.S. provisional patent application No. 60/661,757, filed Mar. 14, 2005 and entitled "Agnostic User Interface for Use in Mobile Devices." The disclosure of this application is incorporated herein by reference. This application is also related to U.S. patent application Ser. No. 11/123,540 file May 5, 2005 and entitled "Universal Text Entry" and U.S. patent application Ser. No. 11/227,323 filed Sep. 14, 2005 (Express Mail Label EV400687109US) and entitled "Cross Platform Event Engine." The disclosure of both of these applications is incorporated herein by reference. This application is further related to U.S. patent application Ser. No. 11/227,272 filed Sep. 14, 2005 (Express Mail Label EV400687112US) and entitled "Platform Neutral User Interface for Mobile Devices," the disclosure of which is incorporated herein by reference. All the aforementioned applications are commonly owned and assigned.

BACKGROUND OF THE INVENTION

1. Field of the Invention

The present invention relates generally to the field of user interfaces. More specifically, the present invention relates to the intelligent rendering of information in a limited display environment by user interfaces, those interfaces operating across various platforms in various mobile devices.

2. Description of the Related Art

Mobile data access devices make it simple and affordable to access corporate and personal data while out of the office. Software allowing for such access is becoming a standard feature on a variety of mobile devices and platforms: BREW, Pocket PCs, Smartphones, Symbian-based phones, PDAs and Internet browsers.

There are approximately 35 million workers that make up the 'mobile workforce,' that is, individuals who carry out all or substantial portions of their job away from a physical office setting. With the increasing number of on-the-go workers, electronic mail continues to be, arguably, the most important business application. As a result, this workforce—as well as the casual individual user—has an inherent need for mobile access to their electronic mail and other data.

Despite an ever-increasing need for access to electronic mail and data, costs of ownership for mobile data access remain a barrier. The issue is no longer whether mobile data access is a necessity but whether it can be deployed and managed in an effective manner.

While cost is an obvious concern in equipping the workforce with the means for accessing data on-the-go, the implementation, development, integration and management of mobile data access solutions are of paramount interest. Despite mobile devices becoming a staple in personal and commercial enterprise, rapidly evolving changes such as number portability, mergers in the telecommunications and software industry and the lack of any one particular technical standard in the mobile device technological space, make providing support for a wide-array of mobile devices an important, albeit difficult, issue with regard to accessing data from a mobile device. The lack of internal expertise, the immaturity of standards, the complexity of integration, device limitations and application development have all been explicitly recognized as barriers to adopting mobile devices for providing access to data while, for example, out of the office or away from a personal desktop computer.

Increased user-flexibility—user familiarity amongst a variety of different devices and/or platforms—may be provided by device-neutral software as is described in the present application. For example, a single application (e.g., a notepad or an e-mail application) could be run on various mobile devices. The user-flexibility proffered by device-neutral software helps to improve IT-familiarity and expertise in that IT personnel need only becomes familiar with one software application (or suite of applications) instead of a particularized application for each individual platform environment and/or mobile device. Such device and platform neutrality increases end-user adoption of mobile device technologies in their fullest sense thereby better ensuring a return on investment.

But as adoption and pervasiveness of mobile devices and operating platforms increase, so does technological fragmentation within the marketplace. That is, with the increasing availability of differing mobile devices and operating platforms, there is an increase in disjunct technologies and methodologies that evidence an increasing need for standardization. Until there exists an overarching technological standard adopted by or at least a significant portion of the marketplace, developing device- and/or platform-neutral applications, as are taught in the present application, for mobile devices makes application development and testing less of a colossal task for software engineers while ensuring higher quality and better overall design.

Device-neutral user interfaces, like those described in the present application, will play a critical role in mobile device development. Such interfaces must not only provide access to mission critical data but also deal with the realities of variations in screen size, pixel density, aspect ratio and screen use availability amongst devices; limited memory on a mobile device; limited processing power; general quirkiness between platforms; and, perhaps most noticeable to the end-user, the general lack of space for interacting with the mobile device (e.g., keyboard space for text-entry and display space for viewing data). A keyboard, mouse or even a stylus are normally not available for such interaction in a traditional wireless or mobile device. Not only is input difficult, so is viewing a display rendering information. This is especially true when the mobile device happens to also be a cellular telephone.

Engineers, have previously been forced to deal with the fact that present-day prior art interfaces are not be suitable for more than one primary set of devices. For example, PDAs utilize a stylus and touch-screen whereas cellular phones may utilize a keypad and/or five-way navigation. If an engineer is satisfied with limiting an interface to a particular type of environment (e.g., platform or device), the engineer must still deal with the nuances of particular device manufacturers (e.g., a Palm PDA versus a Nokia cell phone) and, in some instances, particular device models (e.g., PALM VIIx and Nokia 7110).

Even if an engineer is satisfied with limiting an interface to a particular device, the engineer must still deal with the nuances of particular device manufacturers (e.g., a Palm PDA versus a Nokia cell phone) and, in some instances, particular device models (e.g., PALM VIIx and Nokia 7110).

An engineer is still, in many instances, limited by the fact that he or she must pre-generate static interfaces or multiple permutations of the interface as they pertain to a particular device or platform family. This results in delays for delivery of applications and increased costs in research and development, which inevitably result in increased costs for the end-user.

There is, therefore, a need in the art for a user interface that is neutral with regard to operating platform and device wherein one client interface will work on multiple platforms and devices.

There is a further need in the art for a user interface that will intelligently adjust to hardware and software limitations of a particular device or platform so that information displayed on the user interface will maintain a consistent appearance amongst devices notwithstanding the specific limitations of a particular device or platform.

There is a further need in the art for a user interface that will intelligently adjust to hardware or soft-ware limitations of a particular device or platform so that unnecessary or non-critical information may be removed from display on the user interface to allow for the display of necessary or critical information.

It should be noted, in the course of this disclosure, that while a device (e.g., hardware) and platform (e.g., software) are recognized as distinct—albeit related—entities, any reference to a device or a platform should be considered inclusive of both. Similarly, any reference to the neutrality of an interface, in general, should be interpreted as neutrality as to both a device and a platform.

Further, it should be noted that any disclosed device or platform-neutral user interface is not dependent on the presentation or transmission of communications data (e.g., electronic mail, calendar, SMS) or utilization of user data (e.g., data stored on a desktop).

SUMMARY OF THE INVENTION

The present invention advantageously provides a virtual platform neutral to physical device or software/hardware operating platform. The virtual platform comprises an abstraction layer that allows for portability across a variety of mobile devices and operating platforms, especially with regard to user interfaces. The virtual platform and abstraction layer and any related software allow for a user interface on a first device to appear and operate substantially similar to a user interface on a second device regardless of differences or limitations that may exist between the operating systems or physical nuances of the two devices. By providing a device-neutral user interface application, a user can move effortlessly between devices should, for example, the need for replacement or repair of a particular device arise or if the user possess multiple mobile devices (e.g., one device for personal use and a second device for work use).

Additionally, the neutrality of the interface application makes it possible for software developers and engineers to utilize one test suite for a variety of devices or platforms when introducing new features thereby reducing lag-time in delivering applications to market as well as research and development costs. For example, instead of developing five different interfaces for five different devices, one interface may be utilized across five different devices. These reductions in the time and cost of development and delivery inevitably translate into savings for the end-user and/or increases in profit and competitiveness for the application and/or device developer/manufacturer.

The present invention also provides for preventing distorted images in a user interface caused by pixel variances amongst devices. Relative, dynamic and 'as needed' adjustments in the layout of a user interface are also disclosed as is global scaling of information in a user interface.

The present invention provides for generating a 'quick look' of information in a user interface in addition to intelligent prioritization of menu commands and display icons as well as the management of information utilizing five-way navigation.

BRIEF DESCRIPTION OF THE DRAWINGS

FIG. 4B illustrates the problems often associated with graphic elements rendered in mobile devices with different screen display ratios as found in the prior art.

FIG. 5A illustrates an exemplary relative adjustment in a device-neutral user interface.

FIG. 6A illustrates a menu with 'available' and 'not-available' options as is known in the prior art.

FIG. 6B illustrates a menu exhibiting intelligent prioritization of menu commands as governed by their present availability according to an exemplary embodiment of the present invention.

FIG. 6C illustrates a menu exhibiting intelligent prioritization of menu commands as governed by presently available and user preferred commands according to an exemplary embodiment of the present invention.

FIG. 8A illustrates the display of information on a mobile device as may be found in the prior art.

FIG. 8B illustrates the exemplary management of information displayed in FIG. 8A using five-way navigation in an embodiment of the present invention.

DETAILED DESCRIPTION OF AN EXEMPLARY EMBODIMENT

Figures 1A, 1B:
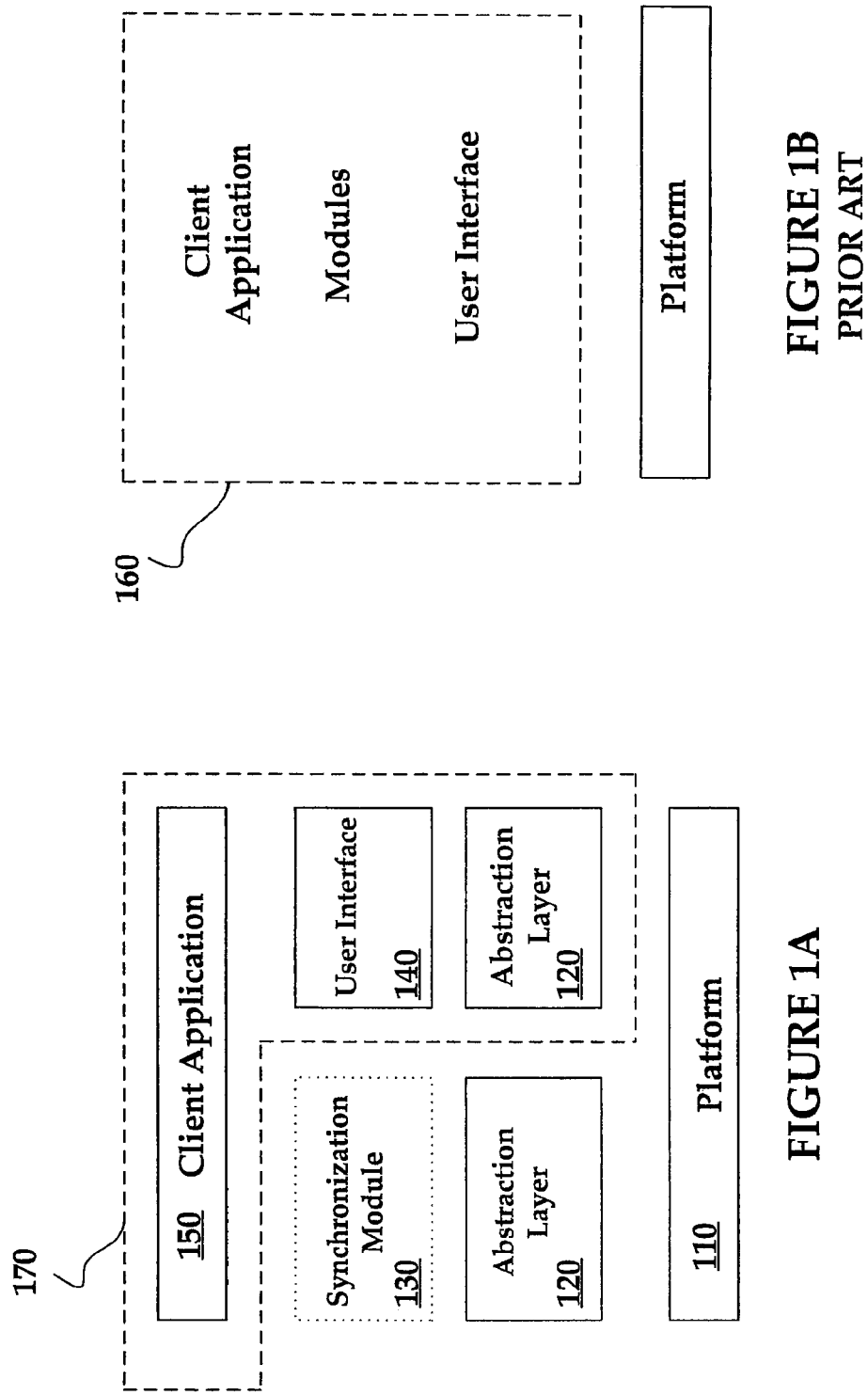
FIG. 1A illustrates an exemplary embodiment of a device platform comprising various operational layers and modules for interaction with a particular device client and as described in the present invention.
FIG. 1B illustrates a device platform comprising various operational layers and modules for interaction with a particular device client as may be found in the prior art.

FIG. 1A illustrates an exemplary embodiment of a device including various operational layers and modules for interaction with the device. The present embodiment comprises a platform 110, abstraction layers.

Some embodiments of the present invention may comprise additional operational layers such as open or proprietary application program interfaces (APIs) that allow software engineers, programmers and even users of a particular platform and/or device to author or install applications that are compatible with the particular platform's operating environment. An intelligent rendering engine may be embodied in such an application. Some embodiments of the present invention may lack certain operational layers or modules, such as synchronization module 130. Such modules would be absent should a particular device or platform not require, for example, synchronization operations.

The platform 110 is the underlying hardware and/or software for a particular operating environment. The platform 110 also defines a particular operating environment in which software, hardware and other applications are developed. An example of platform 110 is the Nokia Series 40 Developer Platform. The Nokia Series 40 Developer Platform can utilize platform technologies such as Java™ J2ME. Another example of platform 110 is the Nokia Series 60 and Series 80 Developer Platforms. The Nokia Series 60 and 80 platforms can utilize C++ in addition to Java™ J2ME technologies. The Palm OS® Platform, as another example of platform 110, supports native programming in C and C++ languages as well as Java programming via third-party Java Virtual Machines. The present invention further envisions the future development of operating environments on a variety of platforms.

Abstraction layer(s) 120 provide basic functionalities and means for accomplishing various operating goals that allow for, in part, the interoperation of the platform 110 with the client application 150 as well as other operational layers such as user interface 140. The abstraction layer(s) 120 provide classes, interfaces, abstract methods and other facilities and resources intended to support various functions and software operations regardless of any particular platform 110 or implementation on any particular device. Abstraction layer(s) 120 may be open or proprietary and are often composed of various information modules (e.g., FIG. 3).

Optional synchronization module 130 comprises the various operational instructions, functionalities and code necessary to allow a particular device or a program residing on such a device to communicate with an external data source, such as a desktop personal computer or enterprise server.

Communications allowing for a synchronization operation can be achieved in a variety of ways including a cable-to-handset synchronization mechanism whereby the device is physically coupled to a desktop personal computer to allow for the exchange and synchronization of data (e.g., electronic mail). Communications can also be achieved wirelessly whereby an enterprise server (e.g., a Microsoft Exchange Server) configured with appropriate software (e.g., SEVEN Server Edition from SEVEN Networks, Inc. of Redwood City, Calif.) coupled with access to a wireless gateway allows for access to electronic mail and other data by the device without any physical connection. Communications can also be achieved without intermediate server software or gateways (e.g., wirelessly).

Synchronization should be appreciated in the most general sense (e.g., as a communication event). For example, synchronization may comprise not only maintaining the consistency of data between two points (e.g., real time calendar data on a handheld device and a desktop computer) but also the duplication of data (e.g., received emails at a desktop forwarded to a handheld). Synchronization may also be utilized for the purpose of updating information (e.g., receiving updated software packages, patches and so forth)

While the optional synchronization module 130 may be necessary for synchronizing the client device and other external data source (e.g., a server), the presence of such a module is not meant to be interpreted as a prerequisite for the operation of a device-neutral user interface.

The user interface 140 comprises and/or is coupled to various modules and software components and source code to allow for the rendering and operation of a user interface on a variety of devices. The user interface 140 comprises or is otherwise coupled to libraries comprising elements and abstractions such as icons, cursors, scroll bars, sounds, animations, etc. and the necessary software and code to enable their use. In an embodiment of the present invention, the user interface 140 is neutral with regard to a particular device or operation environment. That is, a single interface can operate across a plurality of devices (e.g., Nokia, Kyocera and Treo) and/or environments (e.g., Nokia and PalmOS®) without the need to be reprogrammed for each of these particular devices and/or environment. That is, one user interface 140 fits a broad universe of devices and/or environments.

The client application 150 resides on any device coupled to a network (e.g., wirelessly) that allows for access to a server device or other computing entity, such as a second client device. Through the coupling of the device to, for example, a server, the user of the device may receive and transmit data such as electronic mail or access data stored at the server. It should further be appreciated that the present invention may also operate in a device that is not coupled or connected to any particular network or second device.

Small handheld devices are increasingly mobile. This mobility is often a direct result of integrating the handheld device with, for example, a cellular telephone although it is not necessary for the device and related client application 150 to be integrated with a cellular phone or any other particular device.

Mobile devices are often associated with a particular platform 110. For example, the aforementioned Nokia Series 40 Developer Platform is associated with the Nokia 6101 and 6102 model client devices as well as the Nokia 6020, 6235, 6235i and 6822 model client devices. The Nokia Series 60 Developer Platform, on the other hand, is associated with client devices such as the Nokia 6680, 6681, and 6682 model devices. Similarly, the Palm OS® Platform is associated with client devices such as Xplore™ G18, Kyocera 7135, and the Treo™ 650.

FIG. 1B illustrates various operational layers for user interaction and general operation within a particular device as may be found in the prior art. Such a prior art device may comprise the actual platform and various operational layers such as synchronization modules, APIs and so forth.

Prior art devices differ from a device utilized in the context of an embodiment of the present invention in that the client application, user interface and other applications are more integrated, interdependent and operationally incorporated (160) as compared to the present invention (170), which allows for increased flexibility and operability. The 'tightly wound' nature of the prior art is often the result of a general lack of portability of a user interface or any other software between various devices. That is, a particular application, including an interface, is written exclusively for a particular platform and exclusively for a particular device solely in conjunction with that platform. In order for a similar interface with similar functional offerings to operate on another device or platform, that interface must be re-authored in its entirety.

The exemplary device platform illustrated in FIG. 1A, on the other hand, evidences the ability to transport various functionalities from one platform or device to the next, especially with regard to the design of the abstraction layer 120 as is further discussed in the context of FIGS. 2A and 2B, below.

It should be noted that while FIG. 1A illustrates various operational layers as separate elements, this is not to suggest a necessary physical differentiation or a general lack of integration in an embodiment. Similarly, the integration of the client, user interface and abstraction layer (160) in FIG. 1B is not meant to suggest a literal, physical integration. These illustrations are provided merely to aid in the perception of the 'tightly wound' and vertically integrated aspects of the prior art versus an embodiment of the present invention, allowing for intelligent rendering of information in a limited display environment.

Figure 2A:
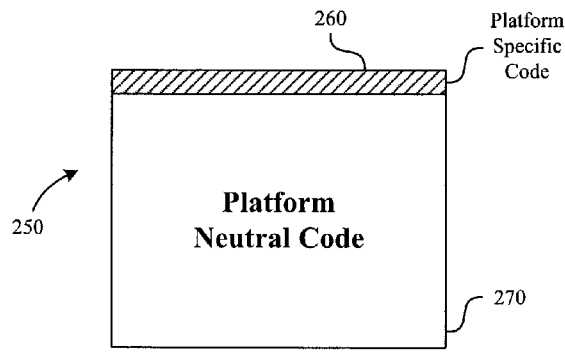
FIG. 2A illustrates an exemplary embodiment of an abstraction layer and a balance of platform-specific code and platform-neutral code as may be found in a device- and/or platform-neutral interface such as that described in the present invention.
Figure 2B:
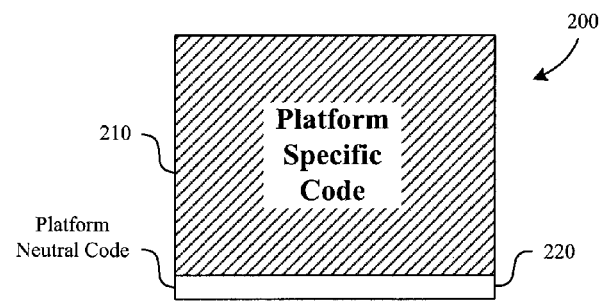
FIG. 2B illustrates a typical balance of platform-specific code and platform-neutral code as may generally be found in the prior art.

FIG. 2B illustrates a balance of platform specific code 210 and platform-neutral code 220 as may be found in the prior art.

For example, and as previously described in the context of FIG. 1B, prior art devices and their related platform and software are generally unitary in nature and are not meant to allow for portability of features, such as a user interface. As such, the prior art code 200 is monolithic in nature and comprised predominantly of platform-specific and application-specific code 210 (e.g., code written for, and only for, a Nokia 6680 device and configured with software written for the Series 60 Developer Platform environment).

This particularized code, while allowing for the integration and operation of a particular device on a particular platform, inhibits the portability of any particular features from one device to another (e.g., a user interface) as may otherwise be provided for with more generalized or device/platform-neutral code 220. Such device/platform-neutral code 220 may comprise code written in accordance with particular industry standards or specifications but that allows for the portability or interoperability of a specific and particular feature amongst devices. This neutral code 220 is minimally—if at all—present in prior art devices.

FIG. 2A illustrates an exemplary embodiment of an abstraction layer 250 and a blend of platform-specific code 260 and platform-neutral code 270 as may be found in a device-neutral user interface offering functionality for intelligent rendering of information in a limited display environment.

An abstraction layer 250, as may be found in an embodiment of the present invention and as illustrated in FIG. 2A, exhibits a much 'thinner' layer of platform- or device-specific code 260. In some embodiments of the present invention, platform specific code may be entirely non-existent. Abstraction layer 250, with its thin layer of platform- or device-specific code 260 may be, generally, the type of abstraction layer 120 as described in FIG. 1A.

As the abstraction layer 250 comprises more platform- or device-neutral code 270, the portability or interoperability of particular features—including a user interface offering intelligent rendering of information in a limited display environment—is increased in that a feature (e.g., an application or function) will operate on various platforms or devices due to its coding being dependent more on the generalized code 270 than with platform- or device-specific code 260 that limits or inhibits portability or interoperability.

Figure 3:
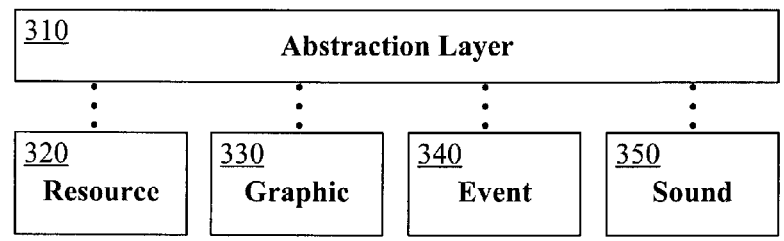
FIG. 3, illustrates an exemplary embodiment of an abstraction layer comprising various informational modules as described in the present invention.

FIG. 3 illustrates an exemplary embodiment of an abstraction layer 310 comprising various informational modules 320-350 as may be implemented in the abstraction layer 250 illustrated in FIG. 2A.

Informational modules 320-350 comprise routines and instructions as they pertain to various operational features of, for example, a particular platform 110 and/or client application 150 linked in the abstraction layer 310. These modules link the particular device to the particular platform.

For example, resource module 320 may comprise specific data or routines utilized in the operation of platform 110, client application 150 and/or device; for example: sleep mode, power on and off in addition to bitmaps, layouts and other libraries of information that are stored on the device or the means for accessing the same.

Graphics module 330 may comprise the information, instructions or knowledge with regard to utilizing specific files such as JPEGs, bitmaps or other graphic data that could be utilized by user interface 140 in its rendering of a user interface on a device. The graphics module 330 may retrieve these files from resource module 320.

Event module 340 may comprise a library of information, instructions or knowledge with regard to identifying actions or occurrences as may be detected by a particular program such as user actions (e.g., pressing a key) in addition to system occurrences (e.g., an internal calendar alarm) and how to translate them across various environments (e.g., as if they were executed in a native environment).

Sound module 350 may comprise the information, instructions or knowledge of how to play or emit various sounds (e.g., WAV files) to be generated in response to, for example, the occurrence of certain system events (e.g., system warnings concerning low battery power). Sound module 350 may retrieve that particular file from the resource module 320.

Abstraction layer 310, as it corresponds to abstraction layer 120 (FIG. 1A) and abstraction layer 250 (FIG. 2A) may comprise additional or fewer modules as is required by the particular platform 110 and/or device and/or client application 150. It should also be noted that while FIG. 3 illustrates various modules as separate elements, this is not to suggest the requirement of a physical differentiation or a general lack of integration in an embodiment of the present invention.

Figure 4A:
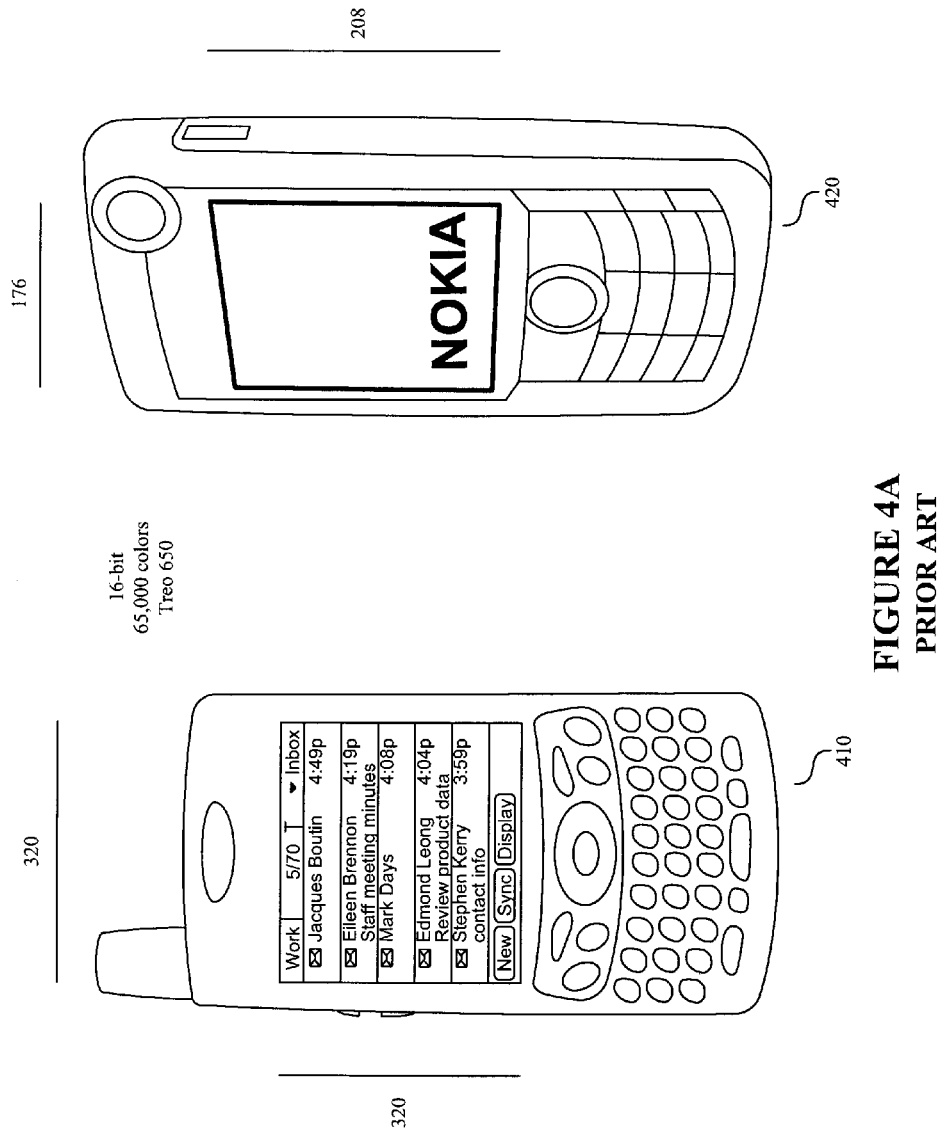
FIG. 4A illustrates the differences in screen display ratio for two different mobile devices as found in the prior art.

FIG. 4A illustrates the differences in screen display ratio for two prior art mobile devices, specifically a TREO™ 650 410 and a Nokia 6680 420. In the case of the TREO™ 650 mobile device 410, the screen display offers 320×320 pixel-width with 16-bit color; the display offers approximately 65,000 colors. In the case of the Nokia 6680 mobile device 420, the screen display offers 176×208 pixel-width with active matrix; the display offers approximately 262,144 colors.

FIG. 4B illustrates the problems often associated with graphic elements rendered in mobile devices with different display ratios as found in the prior art. For example, a graphic 430 (more specifically, in this case, a text string) may be approximately 300 pixels in width and renders without issue on device 410 with a 320 pixel-width. That same graphic (text string), in the context of device 420 with a 176 pixel-width, however, may be distorted 440 in that it is 'cut off' or 'wrapped around' due to the limited screen width. This distortion often results between different devices and/or platform despite the devices and/or platforms otherwise rendering the same graphic. This distortion can be especially problematic in the context of user interfaces offered by third-party software providers either for functionality and/or branding purposes in that certain functionality or brand identification is lost as a result of the distortion.

The device-neutral user interface and intelligent rendering functionality described in the present application aids in preventing distorted images (440) resulting from inevitable pixel variances and other differences between devices and/or platforms. The device-neutral user interface may not only specify a particular layout but also provide for adjustment of the interface environment depending on the particular nuances of any particular platform or device, for example, pixel-width as evidenced in FIGS. 4A and 4B. These adjustments can be generally static relative the permanent limitations of a particular device (e.g., pixel-width) or 'as needed' or 'dynamic' per the particular demands of a particular application and/or the layout of given information at a given time.

An example of relative adjustment in a device-neutral user interface is illustrated in FIG. 5A. A user interface environment 505 is similar in size to that exemplified in mobile device 410 in FIGS. 4A and 4B (320×320). Graphic 510 is rendered in user interface environment 505 in a size that is relative to the pixel limitations of the screen. Graphic 520 is similarly rendered in a user interface environment 515, which corresponds in display size to mobile device 420 in FIGS. 4A and 4B (208×176). But instead of graphic 520 appearing distorted as it did in FIG. 4B (440), the device-neutral interface has provided a substantially similar screen layout but made automatic adjustments for the graphic 520 to appear relative to the physical screen display constraints of the mobile device and its particular interface environment 515. This adjustment may be the result of considering various scaling ratios (e.g., 2:1, 4:1) whereby certain pixels or rendering elements are dropped or otherwise scaled in sized to allow for the relative adjustment of a graphical element or other rendered information.

Figure 5B:
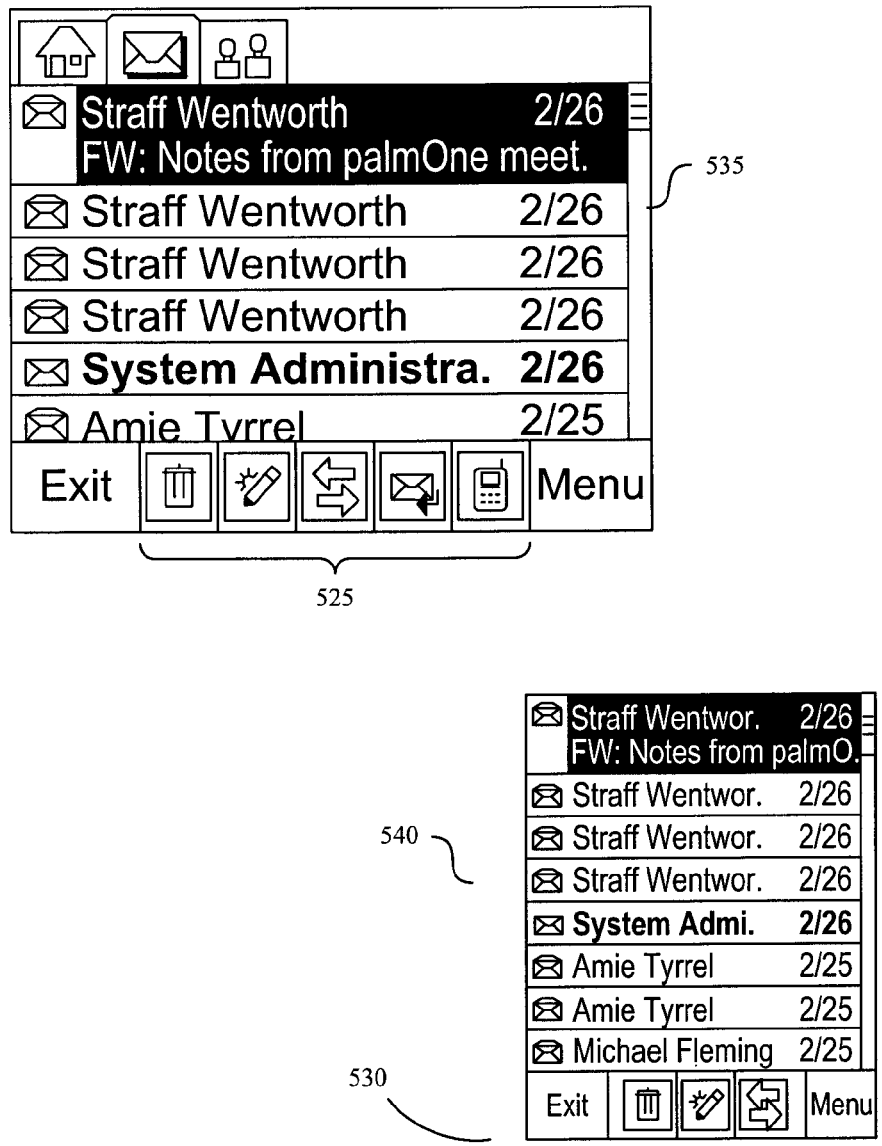
FIG. 5B illustrates an exemplary dynamic adjustment in a device-neutral user interface as it pertains to a global scaling feature.

FIG. 5B illustrates an exemplary dynamic adjustment in a user interface as it pertains to a global scaling feature. In some instances, a particular device will be unable to allow for relative adjustment of a user interface as is disclosed in FIG. 5A. This inability to offer relative adjustments might be a result of screen size limitations or the pure inability to render certain complex or high-definition graphics. In these instances, the device-neutral user interface can make intelligent decisions with regard to what information should be relatively adjusted, which information cannot be relatively adjusted (for varying reasons, for example, the critical importance of certain information) and certain information which should be dropped from the display altogether.

As shown in user interface environment 525, a display screen is shown with certain user interface information 535 such as a tool bar and various short-cut keys such as phone, home, contacts, trash, notes and electronic mail. In a mobile device comprising a user interface environment 530 with limited screen size, relative adjustments to all this information might make the short-cut key and tool bar entirely illegible due to excessive decreases in size and/or overcrowding on the display. In these instances, the device-neutral user interface of the present invention will make intelligent decisions with regard to what information must remain present and the limits on certain relative adjustments of information.

For example, in environment 530 (and as a result of a device-neutral user interface with intelligent rendering capabilities), user interface information 540 has been intelligently adjusted to address the limitations of the screen size. Specifically, certain short-cut keys (electronic mail, home, contacts and phone) have been entirely removed from the display. While these functionalities remain present in the device, their associated short-cut key has been removed from the display environment 530 and now requires access through a tree-menu or some other means as might be dependent on the particular menu structure of the user interface and/or device. Additionally, while other short-cut keys have been reduced in size, other keys remain more prominent. This intelligent rendering may be a result of default settings that identify certain features as being more mission critical than others or as a result of specific user settings. These indicators may comprise metadata reflecting relative importance of certain graphic, information as a whole, in the context of particular applications, in the context of particular tasks and/or operations or as specifically designated by the user.

Figure 5C:
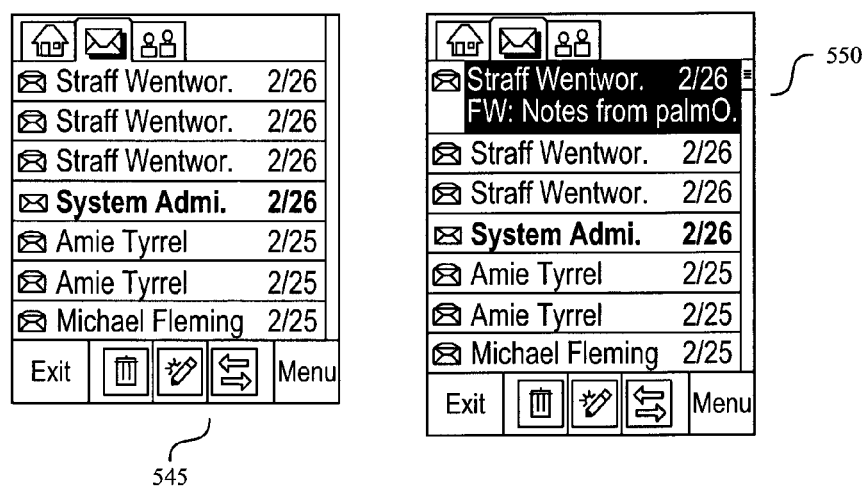
FIG. 5C illustrates an exemplary dynamic adjustment in a device-neutral user interface as it pertains to a zooming feature.

An example of exemplary dynamic adjustment in a user interface as it pertains to a zooming feature is illustrated in FIG. 5C. For example, a user interface environment 545 is shown listing several electronic mails of the user. In an effort to provide the user with as much information as possible, electronic mail information is presented in a small font size making it difficult for a user to sometimes comprehend the information presented in the interface environment 545. Utilizing an exemplary dynamic adjustment zooming feature, as a user scrolls up and down the list of electronic mails, a highlighted or selected electronic mail 550 is magnified or 'zoomed' whereby the font size is increased and all other electronic mails present in the environment 545 are either further reduced in size whereby all information remains on the screen but in reduced size or certain electronic mail listings are 'dropped' from the screen (e.g., instead of ten commonly sized electronic mail listings, zooming-in on any particular electronic mail message will result in one magnified message and seven messages at the original size with the other two messages 'dropped' from the screen).

Dynamic adjustment as a result of zooming may combine certain relative adjustment techniques as described in FIG. 5A in addition to certain intelligent rendering techniques as described in FIG. 5B. Certain embodiments may also allow for a user to specifically highlight particular graphics and/or elements of information in a user interface environment to cause the magnification of that particular graphics and/or element of information (e.g., by highlighting certain elements of information via five-way navigation or through point-and-tap as offered by a stylus and touch sensitive screen).

Figure 5D:
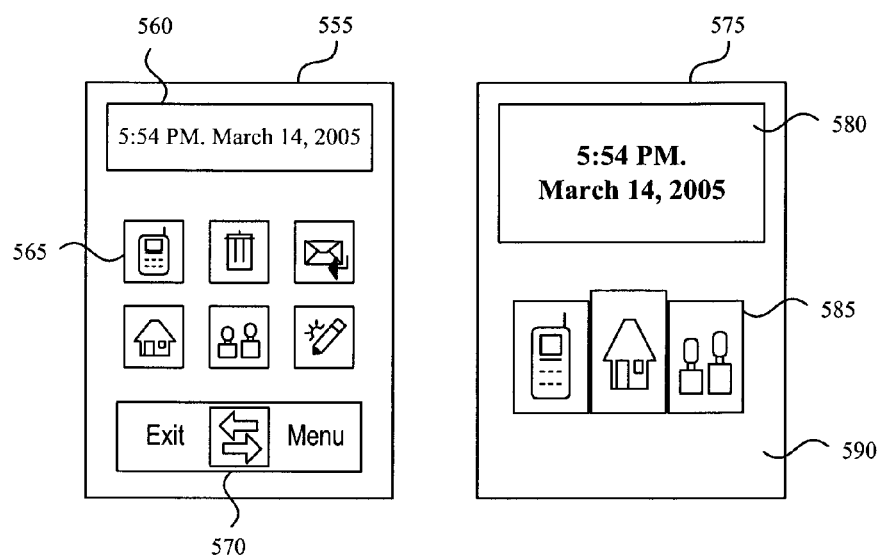
FIG. 5D illustrates an exemplary dynamic adjustment as it pertains to a 'quick-look' or 'short attention span' feature in a device-neutral user interface.

FIG. 5D illustrates exemplary dynamic adjustments in a user interface as those adjustments pertain to a 'quick-look' or 'short attention span' feature. For example, providing a user with all possible available information and in a small font-size may be appropriate when a user of device is able to offer their undivided attention to the device and focus attentively on that information as is shown in device 555. In interface environment 555, the user is presented with time and date information 560, various feature or short-cut keys 565 (e.g., phone, trash, electronic mail, home, contacts, notepad) and a tool bar 570.

In some instances, however, a user may be unable to direct their undivided attention to their device as they might be walking or driving a vehicle. In these instances, the user is forced to divide their attention; for example, ensuring the user does not accidentally walk into another person or veer off the road. The user, to the extent it is necessary for them to access their device with divided attention, often only need to take a 'quick-look' at information (e.g., directions to a destination, the date and time, or who is calling the user). In interface environment 575 illustrates a user interface whereby a 'quick look feature' is enabled and only essential information is displayed.

A 'quick look' feature or interface may be activated in a device by manually changing the display settings of the device through a menu, pressing a specific hard permanent-function key, pressing a soft hot-key assigned to enable 'quick look functionality' or through any other functionality that may allow activation of that particular function (e.g., a timer).

In display environment 575 with a quick-look interface enabled, the user is still presented with time and date information 580 but that information is enlarged in size and takes up twice as much space as the time and date information 560 in non-quick-look enabled environment 555. Additionally, the short cut keys 585 have been reduced in number to only those of utmost importance. In this case, those keys are phone, home and contacts and they are displayed at nearly three-times their normal size. Further, the tool bar 590 has been totally dropped from the screen as it is unlikely a user will be performing maintenance or adjusting settings on their device 575 while only able to offer a short amount of attention.

In a short-attention span or quick-look mode, the adjustment and selection of features to be displayed and, likewise, those features removed from the display can be set by default (e.g., factory settings) or they can be modified by the user as they reflect the user's needs. Furthermore, using a device-neutral user interface, the displayed information will adjust in size as is set forth by the default settings or the user in conjunction with certain limitation posed by the actual device (e.g., screen size). Certain methodologies as reflected in FIGS. 5A and 5B (relative adjustment and intelligent rendering) may be utilized in enabling quick-look functionality including the use of metadata to identify information desired in a quick-look as it might pertain to a particular application or a particular task.

FIG. 6A illustrates a menu 600 with available and not-available options as is known in the prior art. Menu 600 illustrates a number of available menu items 610 such as "New" and "Open." Menu 600 also displays a number of not available menu items 620 such as "Close," "Save" and "Properties."

Available menu items 610 are those menu items or commands that are presently available for execution, for example, opening a new file or opening an existing file. Not available menu items 620 are those menu items or commands that are not presently available for execution due to any number of factors. For example, an actual file or document may not be open. In such a case, a non-existent file cannot be closed or saved. Similarly, properties as to a non-existent file cannot be displayed. Should a file actually be opened, it is possible that certain not available menu items 620 may become available menu items 610 as that now open file or document can now be closed, saved or have its properties reviewed.

In the prior art, not available menu items 620 are usually displayed as 'grayed out.' That is, while available menu items 610 are displayed in a generally prominent text and can be selected either through, for example, highlighting with a mouse or keypad, a macro or other combination of key combinations (e.g., Ctrl+N in Microsoft® Word results in a new document opening), those items that are not available (i.e., not available menu items 620) are generally displayed in a less prominent text (e.g., a light gray color that still allows for readability but indicates Its unavailability as menu command).

In applications with a large hierarchy of menu commands or menu commands with various levels (e.g., File-Open-Folder-File Name), selecting or executing an available menu command 610 often takes up a large amount of screen space due to a multi-level menu tree or various other menu screens, tabs and so forth. In a device with limited display space (e.g., a mobile device), such a complex menu-tree can obfuscate the entire display or, in some instances, may not be subject to display in any form due to the number of levels and/or menus and processing or other display limitations of any particular device.

Even in applications with generally straightforward menu displays, a large number of menu commands can cause the menu to overlap beyond the physical limitations of the screen thereby requiring the necessity of utilizing a scroll or elevator bar. While scroll or elevator bars can artificially provide additional space by scrolling available menu commands 610 up and down the screen, operating such a scroll bar in a limited display area is disadvantageous in that operating minute display tools, such as a scroll bar, with generally small operational controls on a mobile device is more difficult than on a desktop or even a laptop personal computer.

Further, the scroll bar will cause certain available menu commands 610 to disappear from the screen as available menu commands 610 are scrolled up and down by the user. To do so might cause a particular command of importance or interest to a user to disappear as they view other available menu commands 610. Part of this difficulty is a result of the integration of all menu commands on the menu, that is, both available menu commands 610 and not available menu commands 620. For example, a particular menu might comprise ten various commands. Despite the fact that only two of those commands might be available menu commands 610 as a result of the current state of the device or an application, the remaining eight not available menu commands 620 will still be displayed thereby utilizing large amounts of screen display space.

FIG. 6B illustrates a menu 630 exhibiting intelligent prioritization of menu commands as governed by their present availability according to an embodiment of the present invention. In FIG. 6B, the state of the device or application is the same as that of the prior art menu as illustrated in FIG. 6A. In FIG. 6B, however, only available menu commands 640 are displayed. This results in savings of space, memory and processing power as, for example, only two menu commands—New and Open—are displayed (available menu commands 640). In such an embodiment of a menu 630, it would not be necessary to utilize a scroll bar to access various menu commands as the menu 630 is reduced in size due to the non-display of not available menu commands 620.

Should the state of the device or application change, however, those commands that are presently not displayed but otherwise relevant to the change in device state would then be added to the list of available menu commands 640 and displayed on the menu 630.

Certain rendering methodologies (e.g., relative adjustment, dynamic adjustment, zooming and quick-look as described in FIGS. 5A-D, respectively) may further be utilized wherein additional display space in a user interface environment is preserved through further reducing the amount of space occupied by menu 630.

FIG. 6C illustrates a menu 650 exhibiting intelligent prioritization of menu commands as governed by user preference according to an embodiment of the present invention. In FIG. 6C, the state of the device is such that a menu would normally, for example, display ten menu commands if it were a type of a menu as found in the prior art of FIG. 6A. In FIG. 6C, however, only preferred available menu commands 660 are displayed; preferred available menu commands 660 in this particular embodiment are not just those commands capable of execution but those commands capable of execution and whose display presence is preferred by the user of the mobile device relative, for example, a particular application or operational context.

For example, in menu 650 the display of ten available menu commands 660 would still occupy a large amount of space on most mobile devices despite the fact that, for example, five additional commands are not displayed as a result of them being not available. In this particular embodiment, the mobile device will recognize that of the ten available menu commands, the user of the mobile device only utilizes three of those menu commands on any regular basis. The mobile device will then display only those three menu commands as preferred available menu commands 660. Those commands that are not preferred but are otherwise available will not be displayed 670.

This results in a better end user, experience through savings of space, memory and processing power in addition to smoother and more navigable interfaces as only those available menu commands actually needed by the user are displayed. In such an embodiment of a menu, it would not be necessary to utilize a scroll bar to access various menu commands as the menu 650 is reduced in size due to the non-display of not available menu commands as well as available menu commands that are not preferred by the user.

As in the case of FIG. 6B, various rendering methodologies (e.g., relative adjustment, dynamic adjustment, zooming and quick-look as described in FIGS. 5A-D, respectively) may further be utilized wherein additional display space in a user interface environment is preserved through further reducing the amount of space occupied by menu 650.

Preferred available menu commands 660 can be those commands as recognized by the device as being preferred (e.g., in 50 previous uses of a particular menu, only two commands out of ten were utilized) or can be identified manually by the user. Preferred available menu commands 660 can also be set by default by the manufacturer of a device or platform. For example, it may be recognized in the industry that while particular menu commands might be useful, they are only utilized by a small percentage of the public owning the device (e.g., computer programmers). As such, only those commands used by the general public are displayed when available.

Should the state of the device or application change, however, those commands that are presently not displayed but preferred would then be added to the list of preferred available menu commands 660 and displayed on the menu 650 with regard to the state change invoking the availability of certain commands.

Figure 7A:
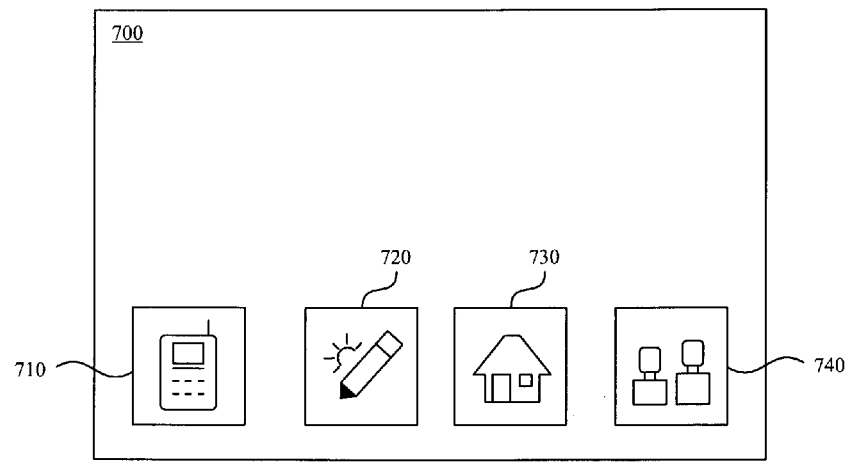
FIG. 7A illustrates icons on a user interface with no particular limitations as to their rendering and as is known in the prior art.

The same intelligence utilized in a menu can also be utilized with regard to display icons. FIG. 7A illustrates a display environment 700 wherein limitations as to screen size, pixels or other factors do not affect the display of a series of icons 710-740 as is generally the case in prior art devices and interfaces. That is, display of the icons 710-740 will occur regardless of screen size. The display of these icons 710-740, however, may be accompanied by distortion, wrap around, cut offs or other unintended and adverse manipulation of the rendered icons 710-740. These icons 710-740 may be for such functions as telephone, notepad, home and contacts.

Figure 7B:
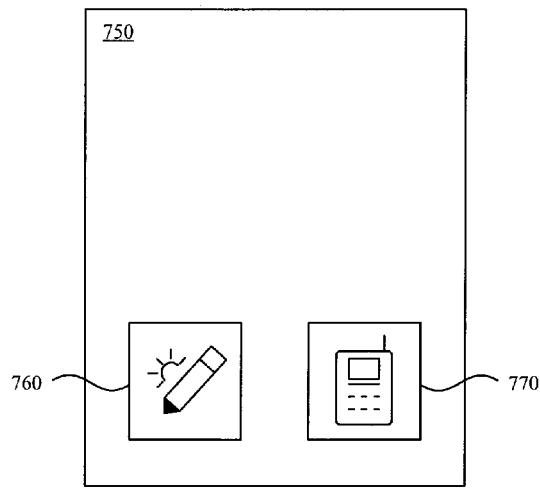
FIG. 7B illustrates icons on a user interface with display limitations wherein the icons are intelligently selected in an exemplary embodiment of the present invention.

FIG. 7B illustrates a display environment 750 wherein certain limitations, screen-width for example, make it impossible for the display of four icons of a given size, or at least the display of those four icons whereby they may be identified or otherwise retain their graphic communications value. In this example, the device interface 750 may display only those icons that are preferred by the user 760-770 such as notepad and telephone. Like the menu displayed in FIG. 6C, these preferred icons 760-770 may be the result of default preferences, user-input preferences or intelligent decision making by logic in a device. This logic may be similar to the logic used in a layout engine as described in U.S. provisional patent application No. 60/661,757. Certain rendering techniques as referenced in FIGS. 5A-5D may also be utilized.

FIG. 8A illustrates the management of information in a prior art display environment 800 using, for example, five-way navigation. Shown on the display 800 are a series of electronic mail messages 810 as may be displayed in a mailbox feature on, for example, a mobile device.

In order to manage electronic mail messages, for example, it is necessary to move a highlight bar to a particular message, open the message (e.g., a center press on the navigation control), enter a delete command either manually, through a drop-down menu or through icon selection, and finally confirm deletion of a message before the message is finally removed from a mobile device's mailbox. The use of a thumb-scroll wheel, 'direction buttons' or a stylus may also be used. In systems where a mobile device is synchronized with a desktop mailbox (e.g., Microsoft® Outlook), an additional confirmation is often required as to whether the user wishes to delete the message only on the mobile device, only on the desktop or on both the handheld and the desktop. The process is then repeated for each message to be deleted. For a user that receives a large number of electronic mail messages on their mobile device, this can be extremely tedious and time consuming in addition to wasting battery and processing resources.

FIG. 8B illustrates the use of a five-way navigation control 820 to manage information such as electronic mail using various graphic rendering and control techniques as have been described throughout the disclosure of the present invention. Using the five-way navigation control 820, a user may move an icon, cursor or other indicator on a display up, down, left and right in addition to a confirmation or 'down click' feature wherein the user presses down on the center of the navigation tool in an action sometimes equivalent to the pressing of the carriage return key on a keyboard. Five-way navigation allows a user to operate various functionalities of a mobile device with one hand and without the use of, for example, a stylus. When combined with intelligent rendering through relative scaling and/or intelligent prioritization, the review, selection and ultimate disposal of certain messages is made easier.

In FIG. 8B, as in FIG. 8A, a list of five electronic mails is presented. Should the user wish to delete two of those electronic mails (e.g., 830 and 840), using traditional management methods would require the user to highlight the first message (830), open the message, enter a delete command either manually, through a drop-down menu or through icon selection and then confirm deletion of the message. Using an exemplary five-way navigation technique in conjunction with the various graphic rendering techniques disclosed herein, the user can navigate down the message to be deleted (830) by pressing down on the navigation tool 820 and then pressing the navigation tool 820 to the right and then down clicking whereby the message is then highlighted and selected for further action, in this instance, deletion.

The user can then press the navigation tool 820 down two more times to arrive at a second message to be deleted (840). The user can then highlight the message for deletion as in the instance of message 820. The user can then, at an appropriate time, select a 'delete all' command wherein all highlighted messages are then deleted. Using five-way navigation is not limited to deletion of messages. A user could also select files to review (e.g., where the user has access to desktop files) or could also manage files or messages to be placed in particular mobile device folders for organization using similar navigation and highlighting techniques. Similarly, a user could select various contacts in a directory to electronically 'beam' (e.g., through a Bluetooth® or infrared transmission) to another user.

The above-described embodiments are exemplary. One skilled in the art will recognize and appreciate various applications of the disclosed invention beyond those presently described here. This disclosure is not meant to be limiting beyond those limitations as expressly provided in the claims.

What is claimed is:

1. A method for presenting information in a limited user interface display environment, comprising:
    selecting a set of textual and graphical components for possible rendering in the limited user interface display environment, wherein the set of textual and graphical components are part of a user interface that allows a user to control a progression of an application or device through a predetermined set of states; and
    without user interaction, determining whether one of the set of components will be rendered incorrectly as a result of a limitation of the limited user interface display environment based upon the present state of the application or device;
    in response to determining that the one component will be rendered incorrectly as a result of a limitation of the limited user interface display environment, determining whether the size of the one component can be adjusted;
    in response to determining that the size of the one component can be adjusted, adjusting the size of the one component prior to rendering it in the limited user interface display environment;
    in response to determining that the size of the one component cannot be adjusted, not rendering the one component in the limited user interface display environment;
    identifying a change in the state of the application or device to a new state;
    in response to identifying a first component that is presently not displayed but relevant to the new state, adding the identified first component to the user interface;
    determining whether an other of the set of components will be rendered incorrectly as a result of a limitation of the limited user interface display environment based upon the new state;
    in response to determining that the other component will be rendered incorrectly as a result of a limitation of the limited user interface display environment, determining whether the size of the other component can be adjusted;
    in response to determining that the size of the other component can be adjusted, adjusting the size of the other component prior to rendering it in the limited user interface display environment;
    in response to determining that the size of the other component cannot be adjusted, not rendering the other component in the limited user interface display environment.

2. The method of claim 1, wherein one of the set of components comprises time information.

3. The method of claim 1, wherein one of the set of components comprises date information.

4. The method of claim 1, wherein one of the set of components comprises shortcut keys.

5. The method of claim 1, wherein one of the set of components comprises a tool bar.

6. The method of claim 1, wherein adjusting the size of a component prior to rendering it comprises reducing the size of the component.

7. A method for presenting menu information in a limited user interface display environment, comprising:
    creating a hierarchy of menu commands in an application, wherein the menu commands are part of a user interface that allows a user to control a progression of an application or device through a predetermined set of states;
    determining the availability of menu commands in the hierarchy of menu commands based upon the present state of the application or device;
    determining preferred menu commands from the available menu commands; rendering the preferred menu commands in the limited user interface display environment and not rendering menu commands that are not preferred;
    identifying a change in the state of the application or device to a new state;
    in response to identifying a first menu command that is presently not displayed but relevant to the new state, adding the identified first menu command to the hierarchy of menu commands;
    determining the availability of menu commands in the hierarchy of menu commands based upon the new state;
    determining preferred menu commands from the available menu commands;
    rendering the preferred menu commands in the limited user interface display environment; and
    not rendering non-preferred menu commands in the limited user interface display environment.

8. The method of claim 7, wherein the preferred menu commands are recognized by a device hosting the limited user interface display environment.

9. The method of claim 7, wherein the preferred menu commands are manually identified a user of a device hosting the limited user interface display environment.

10. A method for adjusting the layout of information in a limited user interface display environment, comprising:
    selecting information for possible rendering in the limited user interface display environment, wherein the information is part of a user interface that allows a user to control a progression of an application or device through a predetermined set of states;
    without user interaction, determining which portions of the information will be relevant to the present state of the application or device;
    rendering the relevant portions of the information in the limited user interface display environment, the information rendered at a first size;
    identifying a change in the state of the application or device to a new state;
    in response to identifying a first portion of the information for possible rendering in the limited user interface display environment that is presently not displayed but relevant to the new state, rendering the identified first portion in the limited user interface display environment; and
    in response to detecting selection of a portion of the displayed information, increasing the size of the selected portion from the first size to a second size, the second size being larger than the first size and decreasing the size of the non-selected portions of the displayed information from the first size to a third size, the third size being smaller than the first size.

11. The method of claim 10, further comprising removing the non-selected portions of the displayed information from the limited user interface display environment.

* * * * *